(12) United States Patent
Uchida et al.

(10) Patent No.: US 6,920,692 B2
(45) Date of Patent: Jul. 26, 2005

(54) WRISTWATCH CASE AND METHOD OF FIXING PIPE TO WRISTWATCH CASE

(75) Inventors: Hitoshi Uchida, Nishitokyo (JP); Kouji Fujii, Nishitokyo (JP); Junji Satoh, Nishitokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 161 days.

(21) Appl. No.: 10/129,857

(22) PCT Filed: Jun. 29, 2001

(86) PCT No.: PCT/JP01/05648

§ 371 (c)(1),
(2), (4) Date: May 10, 2002

(87) PCT Pub. No.: WO02/23283

PCT Pub. Date: Mar. 21, 2002

(65) Prior Publication Data

US 2002/0185863 A1 Dec. 12, 2002

(30) Foreign Application Priority Data

Sep. 13, 2000 (JP) ........................................ 2000-277385
Sep. 27, 2000 (JP) ........................................ 2000-293874

(51) Int. Cl.$^7$ ............................ G04D 3/00; G04B 37/00
(52) U.S. Cl. ................ 29/896.3; 29/896.31; 29/896.33; 29/896.34; 29/458; 29/525; 368/276; 368/327
(58) Field of Search ............................. 29/896, 896.31, 29/896.32, 896.33, 896.34, 447, 458, 525, 896.3; 368/276, 281, 327

(56) References Cited

U.S. PATENT DOCUMENTS 3,901,023 A * 8/1975 Uebelhardt ................ 368/281
4,048,835 A * 9/1977 Giger ........................... 72/334
4,186,552 A * 2/1980 Ishigaki et al. ............. 368/281
5,831,252 A * 11/1998 Shimizu ...................... 219/603
5,885,318 A * 3/1999 Shimizu et al. ............... 65/493
6,019,860 A * 2/2000 Turler et al. ................. 148/563
6,059,175 A * 5/2000 Hamada et al. ............. 228/194

FOREIGN PATENT DOCUMENTS

| JP | 52-110063 A | 9/1977 |
| JP | 57-028690 A | 2/1982 |
| JP | 58-128281 A | 7/1983 |
| JP | 60-223682 A | 11/1985 |
| JP | 61-180685 A | 8/1986 |
| JP | 62-199277 A | 9/1987 |
| JP | 05-220849 A | 8/1993 |

* cited by examiner

Primary Examiner—Essama Omgba
(74) Attorney, Agent, or Firm—The Webb Law Firm, P.C.

(57) ABSTRACT

One wristwatch case, wherein a pipe is fixedly connected thereto and a connection interface between the wristwatch case and the pipe is not present substantially; the method of fixing the wristwatch, comprising the steps of providing a through-hole in the wristwatch case, press fitting the pipe of 0 mm or larger in press fitting tolerance (pipe outer diameter—through-hole diameter) between the through-hole and the pipe, and heating the wristwatch case after the press fitting step; the other wristwatch case, wherein a pipe is fixedly connected thereto through a diffusion layer; the method of fixing the pipe of the wristwatch case, comprising the steps of forming a through-hole in the wristwatch case, press fitting the pipe of 0 mm or larger in press fitting tolerance (outer diameter of pipe having a metal film formed on the surface thereof—diameter of through-hole) between the through-hole and the pipe having a metal film formed on the surface thereof, and heating the wristwatch case in vacuum or reducing gas atmosphere after the press fitting step.

12 Claims, 13 Drawing Sheets

WRISTWATCH CASE AND METHOD OF FIXING PIPE TO WRISTWATCH CASE

TECHNICAL FIELD

The present invention relates to a wristwatch case and a method of fixing a pipe to a wristwatch case. More particularly, the present invention relates to a titanium a pipe to such a wristwatch case, and relates to a wristwatch case of simplified structure which exhibits long-term pipe fixing capability, corrosion resistance and waterproof reliability and a method of fixing a pipe to such a wristwatch case.

BACKGROUND OF THE INVENTION

Titanium or stainless steel has mainly been used as a material for fabricating a wristwatch case. Especially in recent years, the use of titanium and a titanium alloy, which exhibit excellent characteristics in corrosion resistance, strength, lightness and biocompatibility, in exterior parts of a wristwatch is increasing.

For example, the above titanium or stainless steel is useful as a material for fabricating a wristwatch case or a pipe for stem fixing fitted in a wristwatch case. A wristwatch case having a titanium or stainless steel pipe and a method of fixing a pipe to a wristwatch case now present themes which are important from the viewpoint of a long-term use of wristwatch.

Specifically, when it is intended to fix a pipe to a wristwatch case, it is generally needed to provide the step of making a through-hole, as a prepared hole for passing wristwatch case. With respect to this stem hole, for example, it is required that, when a stem furnished with an O-ring is set and fixed, a satisfactory air tightness be realized and maintained at the interface of O-ring and case.

When titanium, a titanium alloy or stainless steel is used as a wristwatch case material, furnishing a wristwatch case of such a material with a through-hole by means of, for example, a drill would often result in roundness deterioration and failure to obtain smooth wrought surface because of the poor machinability of the material.

Accordingly, in order to prevent the deterioration of tightness and decrease of pipe fixing strength attributed to the deterioration of roundness and deterioration of wrought surface smoothness, there is a demand for a method of providing a pipe of higher precision than that of a through-hole made in a case and fixing the pipe to a case by some means.

For example, in order to enhance the dimensional accuracy, it is customary to use a titanium alloy such as Ti-6Al-4V with respect to a titanium case and a free-cutting stainless steel containing a minute amount of sulfur component with respect to a stainless steel case as a pipe material of a free-cutting material of high strength.

Further, when it is intended to fix a separately produced pipe to a through-hole of wristwatch case, it is customary to employ, for example, a method of rendering the outside diameter of the pipe larger than the diameter of case through-hole and press fitting the pipe in the through-hole so as to attain fixing thereof. For example, referring to FIG. 16, through-hole 41a is made at a desired position of wristwatch case 41 constituted of titanium by the use of a drill. This is a hole for inserting a stem to be coupled with a main body known as wristwatch module. Conventional through-hole has a diameter of about 2 mm. The through-hole is made at a side of wristwatch case at 3 o'clock position.

Thereafter, pipe 42 of a titanium alloy having an outside diameter slightly larger than the diameter of the through-hole is produced and press fitted in the through-hole.

However, even if the above titanium alloy or free-cutting stainless steel is used as a wristwatch case material, drilling of the material for making a through-hole is often accompanied by an extreme degradation of working accuracy attributed to welding or the like, and further accompanied by a decrease of roundness of created through-hole attributed to a not necessarily flat structure of wristwatch case.

In the method wherein a pipe fixing is carried out only by the above press fitting, due to, as aforementioned, the roundnesses of pipe circumference and through-hole made in the case and the surface roughness magnitude thereof, an interface exists between the wristwatch case 41 and the pipe 42 because of the influence of the dispersion of dimensional accuracy thereof depending on a combination of the through-hole 41a of the wristwatch case 41 and the outside diameter of the pipe 42. Furthermore, at the interface depressed by the press fitting, a minute gap remains even after the occurrence of partial plastic deformation. These have caused such problems that a stable pipe fixing strength cannot be obtained and further the waterproof sealing properties are deteriorated.

Therefore, in the related art, the waterproofing capability has been ensured by applying adhesive 43 around the gap and thereafter heating at given temperature so as to dry and fix the same.

However, the adhesive is often constituted of organic materials and is likely to suffer deterioration or the like with the passage of long time. Thus, the pipe fixing strength cannot be stably maintained for a prolonged period of time, and further it has been difficult to ensure the waterproofing capability for a prolonged period of time. Moreover, the sealing by the adhesive exhibits high steam permeability, thereby posing such a problem that the moisture proofing capability is poor.

Among other methods of fixing a pipe to a wristwatch case, a fixing method wherein welding is used has been tried. In this method, a projection is provided on the circumference of the pipe and is selectively fused and joined to the wristwatch case.

However, this method poses such a problem that, because of the need to provide a projection on the pipe, the size of the pipe is increased so as to disenable general employment of the method in wristwatches of ordinary size and, further, high cost is inevitable. Moreover, when the projection provided on the pipe does not come into contact with the wristwatch case uniformly all round the circumference thereof, there have been such occasions where the current for welding cannot flow uniformly causing the welding operation to be difficult.

Still further, among other pipe fixing methods, a method wherein brazing is performed has been tried. In this fixing method, first, a through-hole for inserting a stem therein is made at a desired position of a side of wristwatch case. A pipe is then provided. Next, a silver brazing material (Japanese Industrial Standard (JIS) BAg-8 (melting point 780° C.) or the like) is applied on the internal surface of the through-hole or the outside surface of the pipe, and the pipe is fitted in the through-hole. Thereafter, heating is carried out in an electric furnace or a vacuum oven at temperatures higher than the melting point of the brazing material, so that the brazing material is fused to thereby effect brazing of the through-hole and the pipe. In this method, the fused brazing material flows into minute interstices between the through-hole and the pipe and is cooled to thereby solidify. Thus, fixing of the pipe while ensuring airtightness can be accomplished. That is, the brazing material when heated is liquid and can be satisfactorily penetrated into the interstices between the through-hole and the pipe as long as satisfactory wettability is ensured, thereby enabling realization of high waterproof sealing properties.

However, this method poses such a problem that, when, for example, a silver brazing material is used, the silver brazing material is generally constituted of a material containing Cu in a high proportion with the result that satisfactory results cannot be obtained in a corrosion resistance test, such as an artificial sweat test, for wristwatch.

Moreover, in recent years, a brazing material of Ti—Cu—Ni is used as a brazing material for titanium member wherein the content of Cu is reduced. The melting point of this brazing material is in the vicinity of the transformation point of titanium, so that the brazing material has a drawback in that, with respect to, for example, a titanium wristwatch case having undergone a specular finishing before brazing, the surface condition is changed upon brazing. Specifically, the titanium crystal has a hexagonal closest packing structure at ordinary temperatures but assumes a body-centered cubic structure at 882° C., which is the transformation point, or above. Thus, heating at the transformation point or above causes the titanium crystal to be coarse. Therefore, when an operation performed at temperature exceeding the transformation point is included in the process for producing a wristwatch case, for example, fixing a pipe to a wristwatch case, the surface condition is changed by this crystal transformation.

The wristwatch is also appreciated as an ornament, and, with respect to the surface condition, there are various demands, for example, demands for mirror, hairline, honing and matte finishing (satin finishing). Thus, changing of the surface condition at the time of fixing a pipe is unfavorable in the process for producing a wristwatch. In the event of re-polishing of a wristwatch case, it poses such a problem that the process becomes so complex that the practicality thereof would be lost.

On the other hand, with respect to stainless steel, heating at temperature generally ranging from 450 to 850° C., especially from 600 to 850° C., would cause precipitation of Cr carbide to occur at crystal grain boundary. At portions where the Cr carbide has been formed, the chromium oxide of high corrosion resistance would be in a deficient state. It is known that, as a result, such portions would exhibit a locally extremely deteriorated corrosion resistance, thereby becoming the cause of corrosion. This is known as sensitization phenomenon. Therefore, when it is intended to use stainless steel, heating at temperature which falls within the above range must be avoided.

The present invention has been made with a view toward solving the above technological problems of the related art, and an object of the present invention is to provide a wristwatch case which is excellent in waterproofing capability and corrosion resistance and exhibits a long-term reliability regarding a pipe fixing and to provide a method of fixing a pipe to such a wristwatch case.

SUMMARY OF THE INVENTION

The inventors have made extensive and intensive studies with a view toward solving the above problems. As a result, it has been found that a wristwatch case which has excellent waterproofing capability and corrosion resistance and ensures a long-term reliability regarding a pipe fixing can be obtained by a wristwatch case and a method of fixing a pipe to a wristwatch case, wherein the pipe is joined and fixed to a desired position of the wristwatch case and wherein the junction interface of the wristwatch case and pipe is eliminated. The present invention (first aspect of the present invention) has been completed on the basis of this finding.

The inventors have further found that a wristwatch case which has excellent waterproofing capability and corrosion resistance and ensures a long-term reliability regarding a pipe fixing can be obtained by a pipe fixing method wherein the pipe is joined through a specified diffusion layer to a wristwatch case. The present invention (second aspect of the present invention) has been completed on the basis of this finding.

In particular, the present invention has the following characteristics.

(First Aspect of the Invention)

According to the first aspect of the present invention, there is provided a wristwatch case having a pipe joined and fixed thereto, the wristwatch case and the pipe having substantially no junction interface.

Preferably, the wristwatch case comprises a material selected from among pure titanium, titanium alloys and stainless steel, and also the pipe comprises a material selected from among pure titanium, titanium alloys and stainless steel. Still preferably, the wristwatch case comprises a material selected from among pure titanium and titanium alloys, and also the pipe comprises a material selected from among pure titanium and titanium alloys.

The wristwatch case and the pipe may simultaneously comprise stainless steel.

The method of fixing a pipe to a wristwatch case according to this invention comprises the steps of:

providing a wristwatch case with a through-hole, press fitting a pipe exhibiting a through-hole/pipe press-fit overlap width (namely, outside diameter of the pipe minus diameter of the through-hole) of greater than 0 mm in the through-hole, and heating the wristwatch case after the press fitting.

The press-fit overlap width is preferably in the range of 0.01 to 0.05 mm, still preferably in the range of 0.015 to 0.03 mm.

It is preferred that the diameter of the through-hole and the outside diameter of the pipe each exhibit a roundness of 0.01 mm or less.

Preferably, the through-hole on its internal surface has a surface roughness maximum (Rmax1) of 5 $\mu$m or less, and/or the pipe on its outside diameter portion has a surface roughness maximum (Rmax2) of 5 $\mu$m or less.

When the wristwatch case comprises a material selected from among pure titanium and titanium alloys and the pipe comprises a material selected from among pure titanium and titanium alloys, it is preferred that, in the heating step, the heating be performed at 600 to 850° C., especially 700 to 800° C.

In the heating step, it is preferred that the heating be performed for a period of 5 min or more, especially 30 min to 1 hr.

When the wristwatch case and the pipe simultaneously comprise stainless steel, it is preferred that, in the heating step, the heating be performed at 600 to 900° C. In this heating step, the heating is preferably performed for a period of 10 min to 1 hr.

The use of the above method of fixing a pipe to a wristwatch case according to the first aspect of the present invention enables accomplishing a solid-phase joining of titanium, a titanium alloy or stainless steel. At the solid-phase joining, there occurs a solid dissolution of any natural oxide film (oxygen) in the titanium, titanium alloy or stainless steel, so that the intervening interface can be eliminated to thereby realize a desirable junction.

When titanium or stainless steel is allowed to stand in air, active elements of the surface thereof unite with oxygen of the air to thereby form a thin oxide film of about tens of angstroms from the surface. This is called "natural oxide film". Although the presence of this oxide film may hinder a desirable junction, depending on the type of metal, in the solid-phase joining, the oxygen is solid dissolved inside the metal in the use of titanium or stainless steel, especially titanium, so that a desirable solid-phase joining can be realized.

Because the pipe and the wristwatch case are united into one body, adhesives conventionally used for reinforcement are not needed. Therefore, there would not occur any change with the passage of time to thereby ensure a long-term reliability regarding a pipe fixing. Also, a striking enhancement of waterproof sealing capability can be attained. Further, there is no intervening matter between the wristwatch case and the pipe, so that, with respect to corrosion resistance, no problem would arise.

In the first aspect of the present invention, the press-fit overlap width refers to the value obtained by subtracting the through-hole diameter from the outside diameter of the pipe (outside diameter of the pipe minus the diameter of the through-hole).

Further, in the first aspect of the present invention, the terminology "roundness" used herein with respect to the through-hole diameter means the difference between, regarding a through-hole section, through-hole diameter measured in an arbitrary X-direction and through-hole diameter measured in a Y-direction perpendicular thereto. Likewise, the terminology "roundness" used herein with respect to the outside diameter of pipe means the difference between, regarding a pipe section, pipe outside diameter measured in an arbitrary X-direction and pipe outside diameter measured in a Y-direction perpendicular thereto. The above roundness as a characteristic of this invention is the maximum among arbitrarily selected roundness values with respect to the through-hole or the pipe.

Still further, in the first aspect of the present invention, the surface roughness maximum (Rmax1) on the internal surface of through-hole, or surface roughness maximum (Rmax2) on the outside diameter portion of pipe, refers to the maximum of surface unevenness heights.

The above roundness can be measured by the use of a projector or through a measuring microscope. Also, the surface roughness maximum on the internal surface of through-hole and the surface roughness maximum on the outside diameter portion of pipe can be measured by the use of a roundness measuring instrument.

(Second Aspect of the Invention)

According to the second aspect of the present invention, there is provided a wristwatch case having a pipe, the wristwatch case and the pipe joined and fixed to each other through a diffusion layer.

Preferably, the wristwatch case comprises a material selected from among pure titanium, titanium alloys and stainless steel, also the pipe comprises a material selected from among pure titanium, titanium alloys and stainless steel, and the diffusion layer comprises a layer formed by a solid phase diffusion, the diffusion layer containing at least two metals selected from among Ti, Fe, Cr, Ni, Cu, Al, Pt, Au, Pd and Ag. Still preferably, the wristwatch case comprises a material selected from among pure titanium and titanium alloys, also the pipe comprises a material selected from among pure titanium and titanium alloys, and the diffusion layer comprises a layer formed by a solid phase diffusion, the diffusion layer containing at least two metals selected from among Ti, Fe, Cr, Ni, Cu, Al, Pt, Au, Pd and Ag.

The wristwatch case and the pipe may simultaneously comprise stainless steel, and the diffusion layer may comprise a layer formed by a solid phase diffusion, the diffusion layer containing at least two metals selected from among Ti, Fe, Cr, Ni, Cu, Al, Pt, Au, Pd and Ag.

It is preferred that the diffusion layer have a thickness of 1 to 100 $\mu$m.

The method of fixing a pipe to a wristwatch case according to the second aspect of the present invention comprises the steps of:

providing a wristwatch case with a through-hole, press fitting a pipe having its surface furnished with a metallic coating, which exhibits a through-hole/pipe press-fit overlap width (namely, outside diameter of the pipe having its surface furnished with a metallic coating minus diameter of the through-hole) of not less than 0 mm, in the through-hole, and heating the wristwatch case after the press fitting in vacuum or a reducing gas.

The method of fixing a pipe to a wristwatch case according to the second aspect of the present invention may comprise the steps of:

providing a wristwatch case with a through-hole, press fitting a pipe having its surface furnished with a metallic coating, which exhibits a through-hole/pipe press-fit overlap width (namely, outside diameter of the pipe having its surface furnished with a metallic coating minus diameter of the through-hole) of not less than 0 mm, in the through-hole, removing the metallic coating from the pipe surface at portions other than those wherein the wristwatch case and the pipe having its surface furnished with a metallic coating are in contact with each other, and heating the wristwatch case after the press fitting in vacuum or a reducing gas.

In the second aspect of the present invention, it is preferred that the press-fit overlap width be in the range of 0 to 0.05 mm, especially 0.01 to 0.03 mm.

Preferably, the diameter of the through-hole and the outside diameter of the pipe having its surface furnished with a metallic coating each exhibit a roundness of 0.01 mm or less.

Further, preferably, the through-hole on its internal surface has a surface roughness maximum (Rmax3) of 5 $\mu$m or less, and/or the pipe having its surface furnished with a metallic coating on its outside diameter portion has a surface roughness maximum (Rmax4) of 5 $\mu$m or less.

When the wristwatch case comprises a material selected from among pure titanium and titanium alloys and the pipe comprises a material selected from among pure titanium and titanium alloys, it is preferred that, in the heating step, the heating be performed at 600 to 850° C., especially 700 to 800° C.

When the wristwatch case and the pipe simultaneously comprise stainless steel, it is preferred that, in the heating step, the heating be performed at 600 to 900° C. Also, in the heating step, it is preferred that the heating be performed for a period of 10 min to 1 hr.

Preferably, the metallic coating comprises a metal selected from among Cu, Ni, Al, Au, Pt, Pd and Ag, or an alloy of a combination thereof, and has a thickness of 0.1 to 20 µm.

In the above method of fixing a pipe to a wristwatch case according to the second aspect of the present invention, by press fitting a pipe plated with a metallic coating in a through-hole provided in a wristwatch case, the plated coating would exhibit plastic flow at the junction interface between the wristwatch case and the pipe so that any gaps can be filled therewith to a certain degree. Further, the metallic coating can be interposed in a depressed state therebetween. Thereafter, by heating at a given temperature in vacuum or other conditions, an element-level solid phase diffusion would be effected among the wristwatch case, the metallic coating and the pipe with the result that joining of the wristwatch case and the pipe to each other through a diffusion layer can be realized. That is, at the junction interface, there is formed a diffusion layer containing elements constituting the wristwatch case, pipe and metallic coating. This diffusion layer fills surrounding minute gaps, so that not only can excellent waterproof sealing capability be exhibited at the junction interface but also changes with the passage of time can be suppressed by the joining by solid phase diffusion to thereby ensure a long-term reliability regarding a pipe fixing.

As aforementioned, in the second aspect of the present invention, the press-fit overlap width refers to the value obtained by subtracting the through-hole diameter from the outside diameter of the pipe having its surface furnished with a metallic coating (outside diameter of the pipe having its surface furnished with a metallic coating minus the diameter of the through-hole).

Further, in the second aspect of the present invention, the terminology "roundness" used herein with respect to the through-hole diameter means the difference between, regarding a through-hole section, through-hole diameter measured in an arbitrary X-direction and through-hole diameter measured in a Y-direction perpendicular thereto. Likewise, the terminology "roundness" used herein with respect to the outside diameter of the pipe having its surface furnished with a metallic coating means the difference between, regarding a pipe section, the outside diameter of pipe having its surface furnished with a metallic coating measured in an arbitrary X-direction and the outside diameter of pipe having its surface furnished with a metallic coating measured in a Y-direction perpendicular thereto. The above roundness as a characteristic of this invention is the maximum among arbitrarily selected roundness values with respect to the through-hole or the pipe.

Still further, in the second aspect of the present invention, the surface roughness maximum (Rmax3) on the internal surface of through-hole, or surface roughness maximum (Rmax4) on the outside diameter portion of pipe having its surface furnished with a metallic coating, refers to the maximum of surface unevenness heights.

DETAILED DESCRIPTION OF THE INVENTION

First Aspect of Invention

The wristwatch case according to the first aspect of the present invention is one having a pipe joined and fixed thereto, the wristwatch case and the pipe having substantially no junction interface. The expression "having substantially no junction interface" used herein means that an interatomic-level diffusion and joining is realized between the surface of through-hole of wristwatch case and the pipe surface to thereby bring about disappearance of junction interface.

The wristwatch case and pipe for use in this invention can comprise a material selected from among pure titanium, titanium alloys and stainless steel. Each of the material for wristwatch case and the material for pipe can be selected independently, and the materials can be identical with or different from each other. However, it is preferred that the wristwatch case and the pipe comprise the same type of metal, for example, simultaneously comprise a titanium metal such as pure titanium or a titanium alloy, or stainless steel. In the use of a titanium metal, it is especially preferred that the wristwatch case and the pipe simultaneously comprise pure titanium, or a titanium alloy. However, use can be made of a combination of different types of metals, for example, a combination of titanium and stainless steel, or a combination of a titanium alloy and stainless steel.

The procedure for applying the method of fixing a pipe to a wristwatch case according to the first aspect of the present invention will now be described.

The method of fixing a pipe to a wristwatch case according to this invention comprises the steps of providing a wristwatch case with a through-hole; press fitting a pipe exhibiting a through-hole/pipe press-fit overlap width (namely, outside diameter of the pipe minus the diameter of the through-hole) of greater than 0 mm in the through-hole; and heating the wristwatch case after the press fitting.

Figure 1:
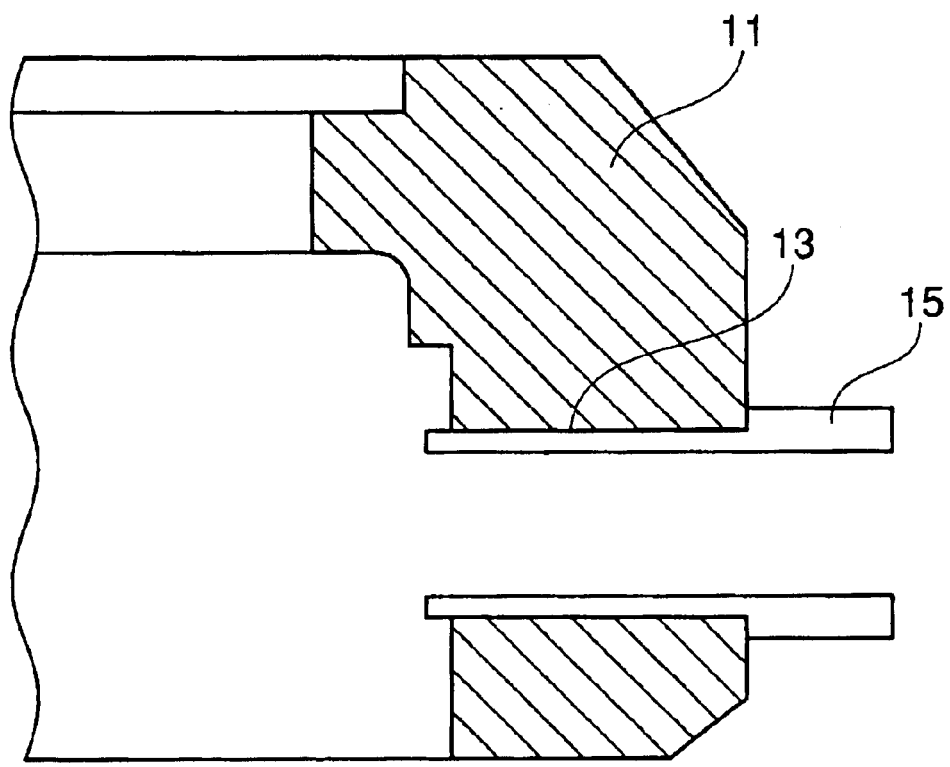
FIG. 1 is a sectional view of a wristwatch case representing one working mode of the first aspect of the present invention.

This method will be described in detail below with reference to FIG. 1. Wristwatch case 11 at its side is provided with through-hole 13 for inserting pipe 15 by drilling. After the drilling, reaming is performed for deburring. Separately, pipe 15 is fabricated by cutting. The pipe 15 is so fabricated that the outside diameter of the pipe 15 is slightly larger than the diameter of the through-hole 13 of wristwatch case 11 so as to attain a press-fit overlap width of greater than 0 mm. The thus fabricated pipe 15 is press fitted in the through-hole 13 to thereby accomplish assembly.

It is preferred that the above press-fit overlap width be in the range of 0.01 to 0.05 mm, especially 0.015 to 0.03 mm.

When the press-fit overlap width falls within the above range, by the solid-phase joining, the through-hole and the pipe can be joined to each other without remaining of any junction interface therebetween. Thus, not only can excellent waterproof sealing capability be ensured but also excellent pipe fixing strength can be obtained. Further, excellent corrosion resistance to artificial sweat, etc. can be exhibited. Especially, when the press-fit overlap width is in the range of 0.015 to 0.03 mm, the influence of dispersion of through-hole and pipe dimensions can be suppressed with greater effectiveness, and the press fitting can be facilitated.

On the other hand, when the press-fit overlap width is less than 0.01 mm, even after the solid-phase joining of the pipe and the wristwatch case, a junction interface may exist between the through-hole of wristwatch case and the pipe to thereby disenable obtaining satisfactory waterproof capability and pipe fixing strength. Further, when the press-fit overlap width is greater than 0.05 mm, it may occur that the pipe is deformed as a result of press fitting thereof, and that the influence of dimensional change with respect to the inside diameter of pipe is serious.

Generally, reaming for deburring is performed after providing the wristwatch case with the through-hole by drilling. It is preferred that the roundness of the diameter of through-hole obtained by the reaming be 0.01 mm or less, especially 0.005 mm or less. In this connection, the roundness of a perfect circle is 0 mm.

With respect to the outside diameter of the pipe as well, it is preferred that the dispersion thereof be less. Accordingly, it is preferred that the roundness of the pipe outside diameter be 0.01 mm or less, especially 0.005 mm or less. In this connection, the roundness of a perfect circle is 0 mm.

Preferably, the through-hole on its internal surface has a surface roughness maximum (Rmax1) of 5 $\mu$m or less, still preferably 3 $\mu$m or less, and/or the pipe on its outside diameter portion has a surface roughness maximum (Rmax2) of 5 $\mu$m or less, still preferably 3 $\mu$m or less.

When the roundness of through-hole internal surface or pipe outside diameter is greater than 0.01 mm, or when the surface roughness maximum (Rmax1) of through-hole and/or the surface roughness maximum (Rmax2) of pipe outside diameter portion is greater than 5 $\mu$m, the junction interface between the wristwatch case and the pipe may not disappear even after the solid phase diffusion joining to thereby disenable obtaining high waterproof capability and pipe fixing strength.

When the wristwatch case comprises a material selected from among pure titanium and titanium alloys and the pipe comprises a material selected from among pure titanium and titanium alloys, it is preferred that, in the heating step, the heating be performed at 600 to 850° C., especially 700 to 800° C. Further, in the heating step, it is preferred that the heating be performed for a period of 5 min or more, especially 30 min to 1 hr.

When the heating temperature is lower than 600° C., high pipe fixing strength may not be obtained. On the other hand, when the heating temperature is higher than 850° C., the wristwatch case after specular polishing may fog. Especially when the transformation point of titanium, namely, 882° C. is exceeded, this trend may be strong.

Excellent pipe fixing strength can be obtained by heating at temperature falling within the above range for a period of 5 min or more.

On the other hand, when the wristwatch case and the pipe simultaneously comprise stainless steel, it is preferred that, in the heating step, the heating be performed at 600 to 900° C., especially 700 to 850° C.

In the use of stainless steel, when the heating temperature falls within the above range, the surface condition of wristwatch case can be maintained. Further, the wristwatch case having excellent pipe fixing strength, waterproof sealing capability and corrosion resistance can be obtained.

When the heating temperature is lower than 600° C., the solid phase diffusion may not satisfactorily proceed to thereby cause poor pipe fixing strength and poor waterproof sealing capability. On the other hand, when the heating temperature exceeds 900° C., the wristwatch case after specular polishing may fog. Although this preferred heating temperature range of 600 to 900° C. includes a temperature zone overlapping with the aforementioned sensitization temperature of stainless steel, it has been found that, in the present invention, when the heating time is 1 hr or less, sensitization would not occur and, in particular, such a phenomenon that corrosion resistance is deteriorated would not occur. It is presumed that the reason would be an extremely short heating time. When the heating is performed for a prolonged period of time, however, the above would not apply. Therefore, it is preferred that, at the above heating temperature, the heating be performed for a period of 10 min to 1 hr.

An instance of pipe joining wherein use is made of titanium or a titanium alloy (working mode A1) and an instance of pipe joining wherein use is made of stainless steel (working mode A2) will be specified below.

(Working Mode A1)

A pipe of titanium or a titanium alloy was press fitted in a wristwatch case of titanium or a titanium alloy. The wristwatch case press fitted with the pipe was placed in a vacuum oven and heated in a vacuum atmosphere at a temperature which was lower than the transformation point of titanium, namely, 882° C. The heating was continued for a given period of time. As a result, an interatomic diffusion occurred at the junction interface between the through-hole provided in the wristwatch case and the pipe, with the result that the junction interface disappeared to thereby accomplish joining of the wristwatch case and the pipe to each other.

(Working Mode A2)

A pipe of stainless steel was press fitted in a wristwatch case of stainless steel. The wristwatch case press fitted with the pipe was placed in a vacuum oven or an oven of reducing gas atmosphere and heated in a vacuum or reducing gas atmosphere at a temperature which was differentiated from the aforementioned temperature of Cr carbide precipitation. The heating was continued for a given period of time. As a result, an interatomic diffusion occurred at the junction interface between the through-hole provided in the wristwatch case and the pipe, with the result that the junction interface disappeared to thereby accomplish joining of the wristwatch case and the pipe to each other.

Second Aspect of the Invention

According to the second aspect of the present invention, there is provided a wristwatch case having a pipe joined and fixed thereto through a diffusion layer.

Each of the wristwatch case and pipe for use in this second aspect of the present invention can comprise a material selected from among pure titanium, titanium alloys and stainless steel. Each of the material for wristwatch case and the material for pipe can be selected independently, and the materials can be identical with or different from each other. However, it is preferred that the wristwatch case and the pipe comprise the same type of metal, for example, simultaneously comprise a titanium metal such as pure titanium or a titanium alloy, or stainless steel. In the use of a titanium metal, it is especially preferred that the wristwatch case and the pipe simultaneously comprise pure titanium, or a titanium alloy. However, use can be made of a combination of different types of metals, for example, a combination of titanium and stainless steel, or a combination of a titanium alloy and stainless steel.

The diffusion layer through which the wristwatch case and pipe of the above materials are joined to each other comprise preferably a layer formed by a solid phase diffusion, the layer containing at least two metals selected from among Ti, Fe, Cr, Ni, Cu, Al, Pt, Au, Pd and Ag.

Preferred diffusion layer material differs depending on a combination of wristwatch case material and pipe material. For example, when the wristwatch case and the pipe comprise simultaneously titanium or a titanium alloy, the diffusion layer preferably contains at least two metals selected from among Ti, Cu, Ni, Au and Pd, still preferably at least two metals selected from among Ti, Cu, Ni and Au. When the wristwatch case and the pipe simultaneously comprise stainless steel, the diffusion layer preferably contains at least two metals selected from among Fe, Cr, Ni, Pt, Pd and Ge, still preferably at least two metals selected from among Fe, Cr, Ni, Pt and Pd.

It is preferred that the above diffusion layer have a thickness of 1 to 100 µm, especially 2 to 10 µm.

This diffusion layer can be formed by, after press fitting of a metallic coating furnished pipe in the through-hole provided in the wristwatch case, heating them in vacuum or other conditions so as to bring about an element-level solid phase diffusion among the wristwatch case, the metallic coating and the pipe. The wristwatch case and the pipe are joined to each other through the thus formed diffusion layer. Further, at the press fitting of the pipe, the metallic coating would make plastic deformation between the metallic coating furnished pipe and the through-hole of the wristwatch case so as to fill any gaps and to enable lying in a depressed state therebetween. This enables further enhancing waterproof capability.

The metallic coating provided on the pipe surface has the same components as those of the diffusion layer and comprises at least two metals selected from among Ti, Fe, Cr, Ni, Cu, Al, Pt, Au, Pd and Ag.

It is preferred that the above metallic coating have a thickness of 0.1 to 20 µm, especially 0.5 to 3 µm.

The metallic coating can be formed on the pipe surface by, for example, plating, vapor deposition, ion plating or CVD technique.

The thickness of the diffusion layer depends on the thickness of the metallic coating of the above components provided on the pipe surface. For example, when the thickness of the metallic coating is 0.1 µm, the thickness of the diffusion layer is 1 µm. When the thickness of the metallic coating is 20 µm, the thickness of the diffusion layer is about 100 µm.

When the thickness of the metallic coating is less than 0.1 µm, namely, when the thickness of the diffusion layer is less than 1 µm, the degree of plastic deformation of metallic coating at the press fitting of the pipe may be unsatisfactory to thereby invite deterioration of waterproof capability. When the thickness of the metallic coating is greater than 20 µm, namely, when the thickness of the diffusion layer is greater than 100 µm, the constitution of interface at the junction of pipe and wristwatch case through-hole may be so complex as to form brittle intermetallic compounds, thereby tending toward lowering of pipe fixing strength.

The procedure for applying the method of fixing a pipe to a wristwatch case according to the second aspect of the present invention will now be described.

The method of fixing a pipe to a wristwatch case according to the second aspect of the present invention comprises the steps of providing a wristwatch case with a through-hole; press fitting a pipe having its surface furnished with a metallic coating, which exhibits a through-hole/pipe press-fit overlap width (namely, outside diameter of the pipe having its surface furnished with a metallic coating minus the diameter of the through-hole) of not less than 0 mm, in the through-hole; and heating the wristwatch case after the press fitting in vacuum or a reducing gas.

Further, the method of fixing a pipe to a wristwatch case according to the second aspect of the present invention may comprise, in addition to the above three steps, the step of removing the metallic coating from the pipe surface at the metallic coating furnished pipe are in contact with each other. In the employment of the method of fixing a pipe to a wristwatch case according to the second aspect of the present invention, after the pipe fixing, the metallic coating at portions other than those wherein the wristwatch case and the metallic coating furnished pipe are in contact with each other is exposed on the pipe surface. When the components of metallic coating contain, for example, Cu, the formation of diffusion layer by effecting the solid phase diffusion by heating at the exposed metallic coating portions may cause a surface discoloration. Therefore, this step may be added.

When the step of removing the metallic coating from the pipe surface is added, it is preferred that the removal of the exposed metallic coating from the pipe surface be performed prior to the above heating treatment.

With respect to the method of removing the metallic coating from the pipe surface at portions other than those wherein the wristwatch case and the metallic coating furnished pipe are in contact with each other, for example, etching can preferably be used from the viewpoint of capability of selectively removing the metallic coating only.

In the second aspect of the present invention, it is preferred that the press-fit overlap width (namely, outside diameter of the pipe having its surface furnished with a metallic coating minus the diameter of the through-hole) be in the range of 0 to 0.05 mm, especially 0.01 to 0.03 mm.

When the press-fit overlap width falls within the above range, not only can the metallic coating make appropriate plastic deformation at the press fitting of the pipe to thereby fill any gaps between the wristwatch case and the pipe but also the diffusion layer formed by the solid phase diffusion among the wristwatch case, the metallic coating and the pipe can fill any gaps between the through-hole of the wristwatch case and the pipe. Therefore, excellent waterproof capability and pipe fixing strength can be obtained. Further, excellent corrosion resistance to artificial sweat, etc. can be ensured.

When the press-fit overlap width is less than 0, effective plastic deformation would be difficult to thereby fail to completely fill minute gaps between the through-hole of the wristwatch case and the pipe. Thus, satisfactory waterproof capability and pipe fixing strength may not be obtained. On the other hand, when the press-fit overlap width is greater than 0.05 mm, the press fitting of pipe may cause pipe deformation, and the influence of dimensional change of pipe inside diameter may be unfavorably large.

Generally, reaming for deburring is performed after providing the wristwatch case with the through-hole by drilling. It is preferred that the roundness of the diameter of through-hole obtained by the reaming be 0.01 mm or less, especially 0.005 mm or less. In this connection, the roundness of a perfect circle is 0 mm.

With respect to the outside diameter of the pipe having its surface furnished with metallic coating as well, it is preferred that the dispersion thereof be less. Accordingly, it is preferred that the roundness of the pipe outside diameter be 0.01 mm or less, especially 0.005 mm or less. In this connection, the roundness of a perfect circle is 0 mm.

Preferably, the through-hole on its internal surface has a surface roughness maximum (Rmax3) of 5 $\mu$m or less, still preferably 3 $\mu$m or less, and/or the pipe having its surface furnished with a metallic coating(metallic coating furnished pipe) on its outside diameter portion has a surface roughness maximum (Rmax4) of 5 $\mu$m or less, still preferably 3 $\mu$m or less.

When the roundness of through-hole internal surface or the roundness of outside diameter of metallic coating furnished pipe is greater than 0.01 mm, or when the surface roughness maximum (Rmax4) of outside diameter portion of metallic coating furnished pipe is greater than 5 $\mu$m, any gaps between the wristwatch case and the metallic coating furnished pipe may not be completely filled even after the metallic coating plastic deformation or heat treatment to thereby disenable obtaining high waterproof capability and pipe fixing strength.

When, according to the second aspect of the present invention, the wristwatch case comprises a material selected from among pure titanium and titanium alloys and the pipe comprises a material selected from among pure titanium and titanium alloys, it is preferred that, in the heating step, the heating be performed at 600 to 850° C., especially 700 to 800° C. Further, in the heating step, it is preferred that the heating be performed for a period of 5 min or more, especially 30 min to 1 hr.

When the heating temperature is lower than 600° C., the solid phase diffusion reaction may not satisfactorily proceed to thereby disenable obtaining high pipe fixing strength or to suffer poor waterproof capability. Further, a long time may be needed in the joining, so that it is not practical.

On the other hand, when the heating temperature is higher than 850° C., because of the closeness to the transformation point of titanium, the crystal structure may be coarse to thereby suffer such a partial transformation that the surface is roughened to result in fogging of the wristwatch case after specular polishing. Hence, it may be needed to complete the heat treatment within a short period of time. Especially when the transformation point of titanium, namely, 882° C. is exceeded, this trend may be strong. Although, even if the surface is roughened, the original state can be restored by, for example, re-polishing, not only would the operations become complex but also a cost increase would be invited. Thus, it is not practical.

Excellent pipe fixing strength can be obtained by heating at temperature falling within the above range for a period of 5 min or more.

On the other hand, when the wristwatch case and the pipe simultaneously comprise stainless steel, it is preferred that, in the heating step, the heating be performed at 600 to 900° C., especially 700 to 850° C.

In the use of stainless steel, when the heating temperature falls within the above range, the surface condition of wristwatch case can be maintained. Further, the wristwatch case having excellent pipe fixing strength, waterproof sealing capability and corrosion resistance can be obtained.

When the heating temperature is lower than 600° C., the solid phase diffusion may not satisfactorily proceed to thereby cause poor pipe fixing strength and poor waterproof sealing capability. On the other hand, when the heating temperature exceeds 900° C., the wristwatch case after specular polishing may fog. Although this preferred heating temperature range of 600 to 900° C. includes a temperature zone overlapping with the aforementioned sensitization temperature of stainless steel, it has been found that, in the present invention, when the heating time is 1 hr or less, sensitization would not occur and, in particular, such a phenomenon that corrosion resistance is deteriorated would not occur. It is presumed that the reason would be an extremely short heating time. When the heating is performed for a prolonged period of time, however, the above would not apply. Therefore, it is preferred that, at the above heating temperature, the heating be performed for a period of 10 min to 1 hr.

An instance of pipe joining wherein use is made of titanium or a titanium alloy (working mode B1) and an instance of pipe joining wherein a metallic coating is removed (working mode B2), according to the second aspect of the present invention, will be specified below.

(Working Mode B1)

A working mode according to the second aspect of the present invention will be described with reference to FIG. 11.

In this working mode B1, first, through-hole 41a was made at a desired position of wristwatch case 41. This was a through-hole for inserting therein a stem to be coupled with a main body known as wristwatch module. In this working mode B1, the hole diameter was 2 mm, and, after drilling for making the through-hole, reaming was performed for also accomplishing deburring.

Subsequently, pipe 42a of a titanium alloy with an outside diameter slightly larger than the diameter of the through-hole, having its surface entirely covered with a metallic coating, a Pd plating layer in this working mode B1, was produced so that the outside diameter of the pipe at a press fit portion was 2.02 mm in the state of being covered with the Pd plating layer. This pipe was press fitted in the through-hole made in the wristwatch case. The press-fit overlap width was 0.02 mm (2.02−2=0.02). The outside diameter of the pipe was not a perfect circle because of a slight eccentricity attributed to cutting operation employed in the fabrication of the pipe. The difference between outside diameter measured in an arbitrary X-direction and outside diameter measured in a Y-direction perpendicular thereto, namely, roundness was about 0.01 mm.

Thereafter, the wristwatch case after the press fitting was heated at 800° C. in a vacuum on the order of $10^{-6}$ torr for about 30 min. At the heating, the Pd coating was present at the interface of case material titanium and pipe material titanium alloy brought into contact to each other at the press fit portion 45 of the wristwatch case, and, at the interface, a solid phase diffusion reaction occurred. It is presumed that the titanium oxide layer which was present on the surface of titanium or titanium alloy at the time of press fitting would be removed as a result of the plastic deformation at press fitting, and that new surfaces would be exposed and brought into contact to each other. Further, it was recognized that, when the heating was effected to about 800° C., a counter diffusion of metals occurred at the interface of titanium and Pd to thereby form diffusion layer 44. It was found that titanium and Pd were metals having relatively high liability to undergo counter diffusion, and that satisfactory diffusion would occur at temperatures lower than the melting points of the metals. It is presumed that this would relate to the fact that a phase diagram of titanium and Pd shows intermetallic compounds at a wide variety of compositions.

Figure 11:
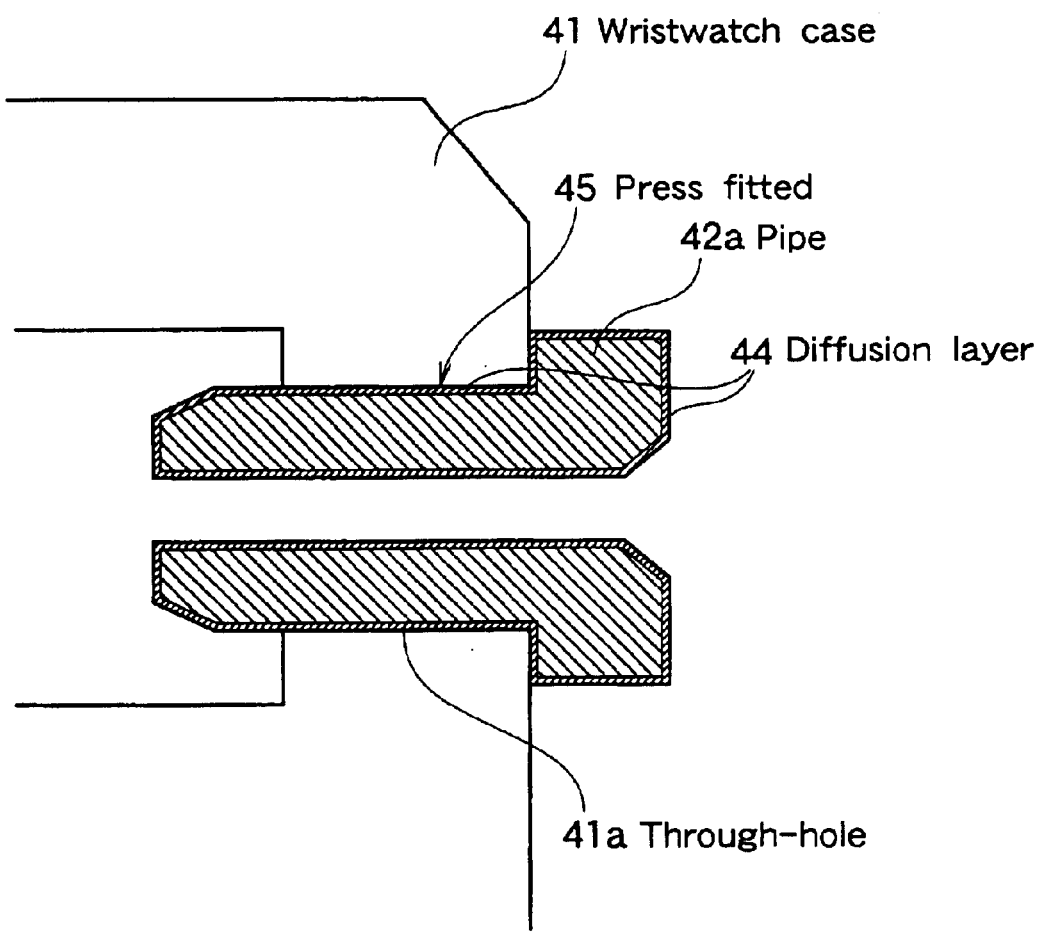
FIG. 11 is a schematic sectional view of a pipe fixing portion produced by the method of fixing a pipe to a wristwatch case according to one working mode of the second aspect of the present invention.

Referring to FIG. 11, the external surface of pipe at portions other than the press fit portion was heated in vacuum in the state of being coated with Pd, so that a solid phase diffusion occurred at the external surface. Thus, the entire surface of the pipe 42a was coated with diffusion layer 44 (intermetallic compound or solid solution) containing titanium and Pd, formed by diffusion of titanium in the surface layer. However, this diffusion layer had a metallic color and had an excellent corrosion resistance, so that the change of surface layer posed no problem from the viewpoint of practical use of wristwatch.

(Working Mode B2)

Figure 12:
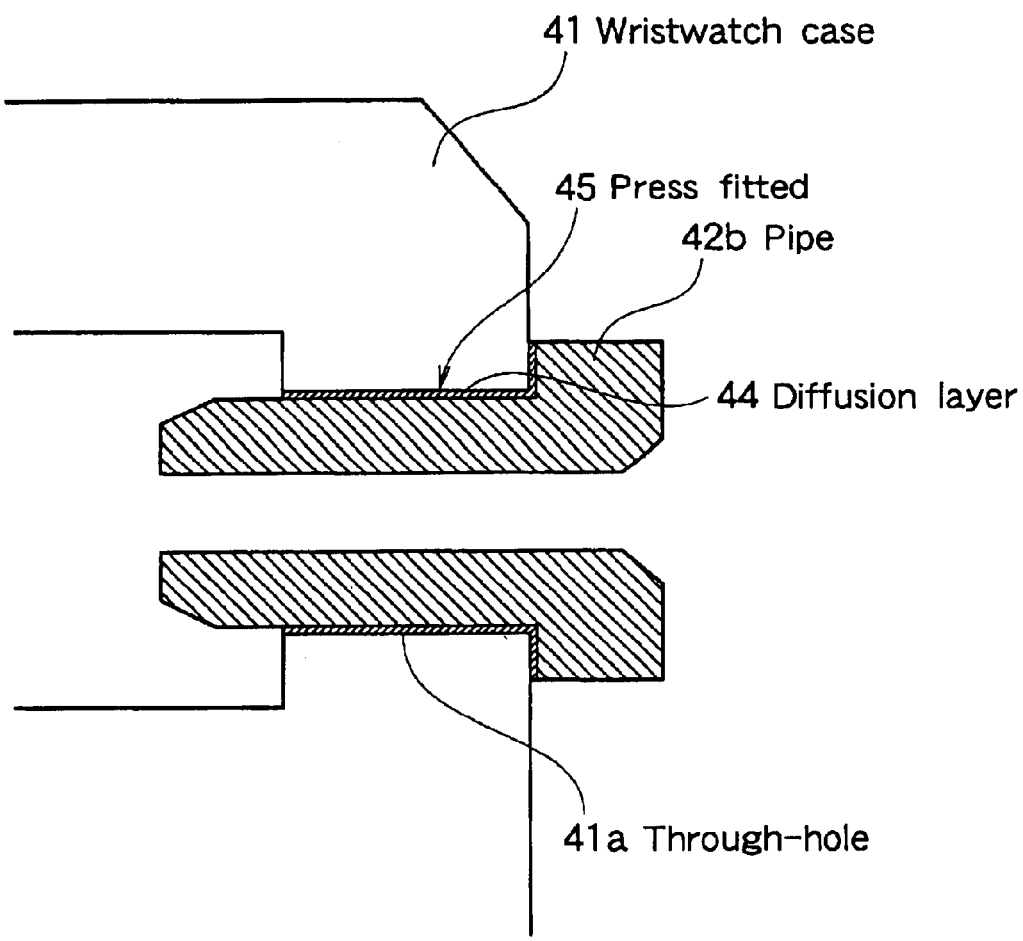
FIG. 12 is a schematic sectional view of a pipe fixing portion produced by the method of fixing a pipe to a wristwatch case according to another working mode of the present invention.

Working mode B2 according to the second aspect of the present invention will be described with reference to FIG. 12. First, through-hole 41a was made at a desired position of wristwatch case 41. This was a through-hole for inserting therein a stem to be coupled with a main body known as wristwatch module. In this working mode B2, the hole diameter was 2 mm, and, after drilling for making the through-hole, reaming was performed for also accomplishing deburring.

Subsequently, pipe 42b of a titanium alloy with an outside diameter slightly larger than the diameter of the through-hole, having its surface entirely covered with a metallic coating, a Cu plating layer in this working mode, was produced and press fitted in the through-hole. The outside diameter of the pipe at the press fit portion was 2.02 mm in the state of being coated with the Cu plating layer. The outside diameter of the pipe was not a perfect circle because of a slight eccentricity attributed to cutting operation employed in the fabrication of the pipe. The difference between outside diameter measured in an arbitrary X-direction and outside diameter measured in a Y-direction perpendicular thereto, namely, roundness was about 0.01 mm The press-fit overlap width was 0.02 mm (2.02−2=0.02).

Further, the step of removing the metallic coating at portions other than the press fit portion was carried out. In this working mode B2, unneeded Cu coating on the surface after the press fitting was removed by the use of a nitrate etchant capable of selectively etching only the Cu coating without corroding the titanium. Exposed Cu coating on the pipe surface at portions other than the press fit portion could be etched by immersing the wristwatch case after the pipe press fitting in the etchant.

Thereafter, the resultant wristwatch case was heated at 800° C. in a vacuum on the order of $10^{-6}$ torr for about 30 min. It was recognized that, at the time of heating, a counter diffusion of metals occurred at the interface of titanium and Cu to thereby form a diffusion layer of titanium and Cu. It was found that titanium and Cu were metals having relatively high liability to undergo counter diffusion, and that satisfactory diffusion would occur at temperatures lower than the melting points of the metals. It is presumed that this would relate to the fact that a phase diagram of titanium and Cu shows a multiplicity of intermetallic compounds and solid solutions. Not only would quite some part of oxide layer on the titanium or titanium alloy surface be replaced by exposed new surfaces as a result of plastic deformation at the time of press fitting but also oxygen would be dissolved in the titanium during the heating period. Consequently, the diffusion layer would be formed without remaining of oxygen at the interface.

When the Cu coating remains at surface portions other than the press fit portion 45, the solid phase diffusion would occur there with the result that the diffusion layer containing titanium and Cu would be formed. Thus, the surface would look discolored blackish. With respect to wristwatches, the discoloration at exposed portions is not favorable from the viewpoint of appearance. Therefore, in the event that such intermetallic compounds are formed to thereby cause surface discoloration, it is desirable to remove unneeded metallic coating before the heat treatment.

This working mode B2 is different from the working mode B1 in that the diffusion layer 44 is formed only at the press fit portion 45 so as to join the wristwatch case and the pipe to each other, whilst any diffusion layer is not formed on exposed pipe surfaces.

Figure 13:
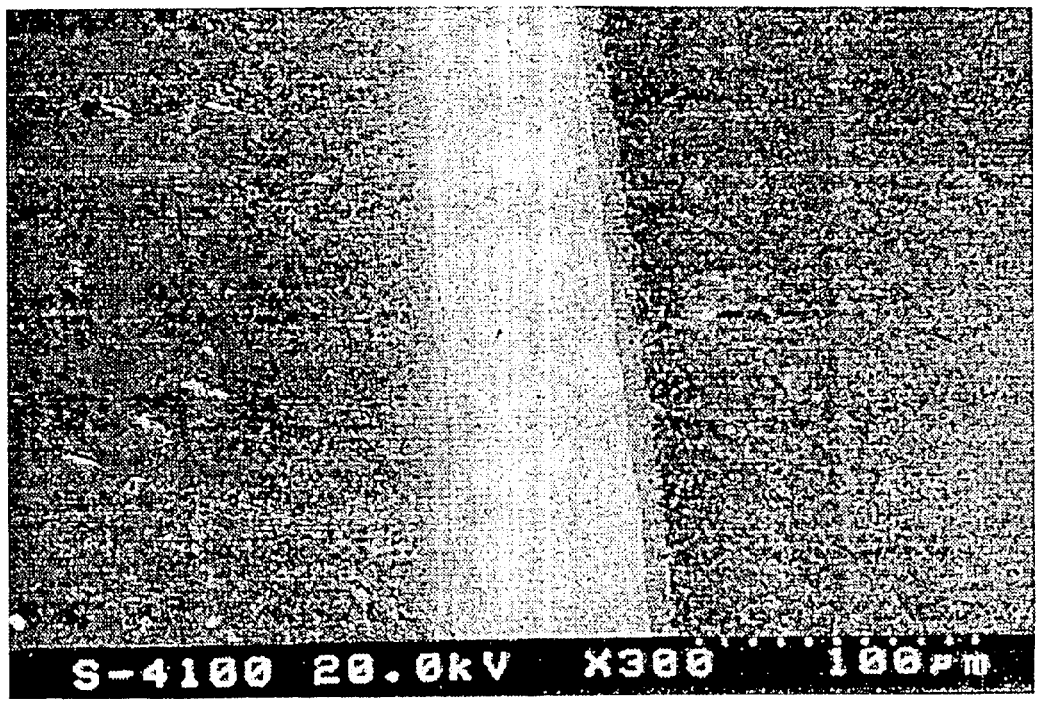
FIG. 13 is a photograph of SEM image of a section of Ti|TiCu diffusion layer|Ti alloy interface junction portion according to one working mode of the present invention.

A scanning electron micrograph of a junction interface at which a pipe was fixed to a wristwatch case in accordance with the pipe fixing method of this working mode B2 is shown in FIG. 13. In the micrograph, the left side shows titanium as a case material, and the right side shows a titanium alloy as a pipe material. In the middle, a Cu plating layer was originally disposed in depressed form at the time of press fitting, but, as a result of heating in vacuum, a diffusion layer mainly composed of titanium and Cu was formed by a solid phase diffusion reaction of titanium and Cu. It was recognized that the pipe was joined and fixed to the wristwatch case through the diffusion layer.

(Evaluation B1)

Figure 14:
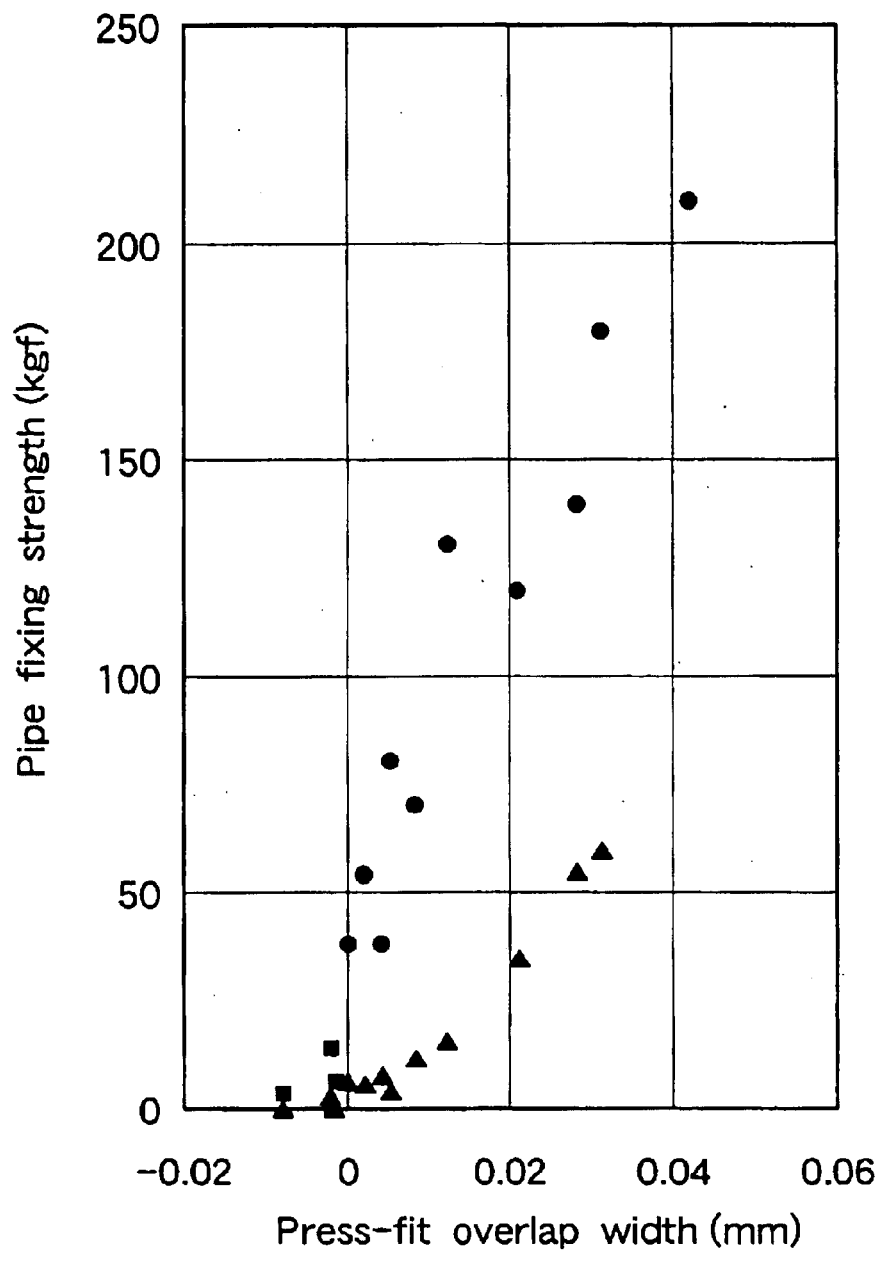
FIG. 14 is a graph showing interrelationships among press-fit overlap width, pipe fixing strength, performing or non-performing of heat treatment in vacuum and waterproof test results.

With respect to wristwatch cases produced in the working mode B1 according to the second aspect of the present invention, the relationships among the press-fit overlap width (outside diameter of the pipe having its surface furnished with a metallic coating minus the diameter of the through-hole), pipe fixing strength and waterproof sealing capability were evaluated, and the results are shown in FIG. 14. FIG. 14 plots the press-fit overlap width on the axis of abscissa and the pipe fixing strength on the axis of ordinate. The greater the press-fit overlap width, the greater the pipe deformation. Naturally, the pipe fixing strength increased accordingly. It is seen that samples including the junction attained by heating in vacuum so as to effect a solid phase diffusion at an interface exhibit an extreme increase of pipe fixing strength over those of samples only through a press fitting even at the same press-fit overlap width. These results suggest that, when a pipe is fixed only by press fitting, the press-fit overlap width for ensuring a required fixing strength of 10 kgf must be 0.01 mm or more. The pipe fixing strength is strikingly increased by the solid-phase joining attained by the heating in vacuum according to the second aspect of the present invention.

(Evaluation B2)

FIG. 14 shows a correlation with waterproof test results. The waterproof test was performed in the following manner. A back lid of wristwatch case was detached, and the wristwatch case in open form was placed on a hot plate. The moisture of the inside of the wristwatch case was completely removed. Immediately thereafter, the wristwatch case was sealed with the back lid and fixed, and the resultant wristwatch case was immersed in a water of 10 atm for a given period of time. The wristwatch case was taken out, and the surface water was completely wiped off. Again, the wristwatch case was placed on a hot plate for quite some time. Cold water was applied to the glass surface of the wristwatch case to thereby rapidly cool the same. In the event of presence of moisture inside the wristwatch case, the moisture condensed on the glass surface, and glass fogging is observed. In this test, samples exhibiting fogging were evaluated as failure in the waterproof test, and samples not exhibiting any fogging were evaluated as success in the waterproof test.

Consideration will be made in relation to the waterproof sealing test. The wristwatch case through press fitting only suffered waterproof failure even when the press-fit overlap width was satisfactorily large. This would relate to the roundness and surface roughness with respect to the pipe having its surface furnished with a metallic coating or the through-hole formed in wristwatch case, and suggests that minute protrusions at the interface would not completely be eliminated by the press fitting. Therefore, when only the press fitting is executed, application of an adhesive must be effected for ensuring the waterproof capability.

By contrast, in the second aspect of the present invention, waterproof failure was avoided and excellent waterproof sealing capability was exhibited as long as the press-fit overlap width was not less than 0 mm. It is presumed that, upon the press fitting, the metallic coating which was relatively soft and easily deformable filled minute gaps, and that further, at the heat treatment in vacuum, the titanium and the metallic coating (Cu in this working mode) underwent element-level diffusion to thereby form a diffusion layer, which completed filling of the gaps. However, when the press-fit overlap width was less than 0 mm, it was found that the minute gaps could not completely be filled to thereby cause waterproof failure. Therefore, it has been ascertained that the press-fit overlap width as an important parameter in the second aspect of the present invention must be 0 mm or greater.

In the above working modes B1 and B2, Pd and Cu were employed as examples of metals for forming the metallic coating provided on the pipe surface by plating. However, naturally, the metals for forming the metallic coating are not limited thereto, and similar results can be attained by the plating layer of any of Al, Au, Pt, Pd and Ag, which are metals capable of realizing a solid phase diffusion with titanium at temperatures of not higher than the transformation point of titanium to thereby form an intermetallic compound, hence enabling interfacial joining.

Moreover, although, in the above working modes, a combination of titanium and Pd and a combination of titanium and Cu were mentioned as examples of elements for forming the diffusion layer at case/pipe interface formed by solid phase diffusion, similar results can be obtained by the diffusion layer of at least two elements selected from among titanium; Fe, Cr and Ni which are main components of stainless steel; and Cu, Ni, Al, Au, Pt, Pd and Ag for constituting plating metallic coatings.

(Evaluation B3)

Figure 15:
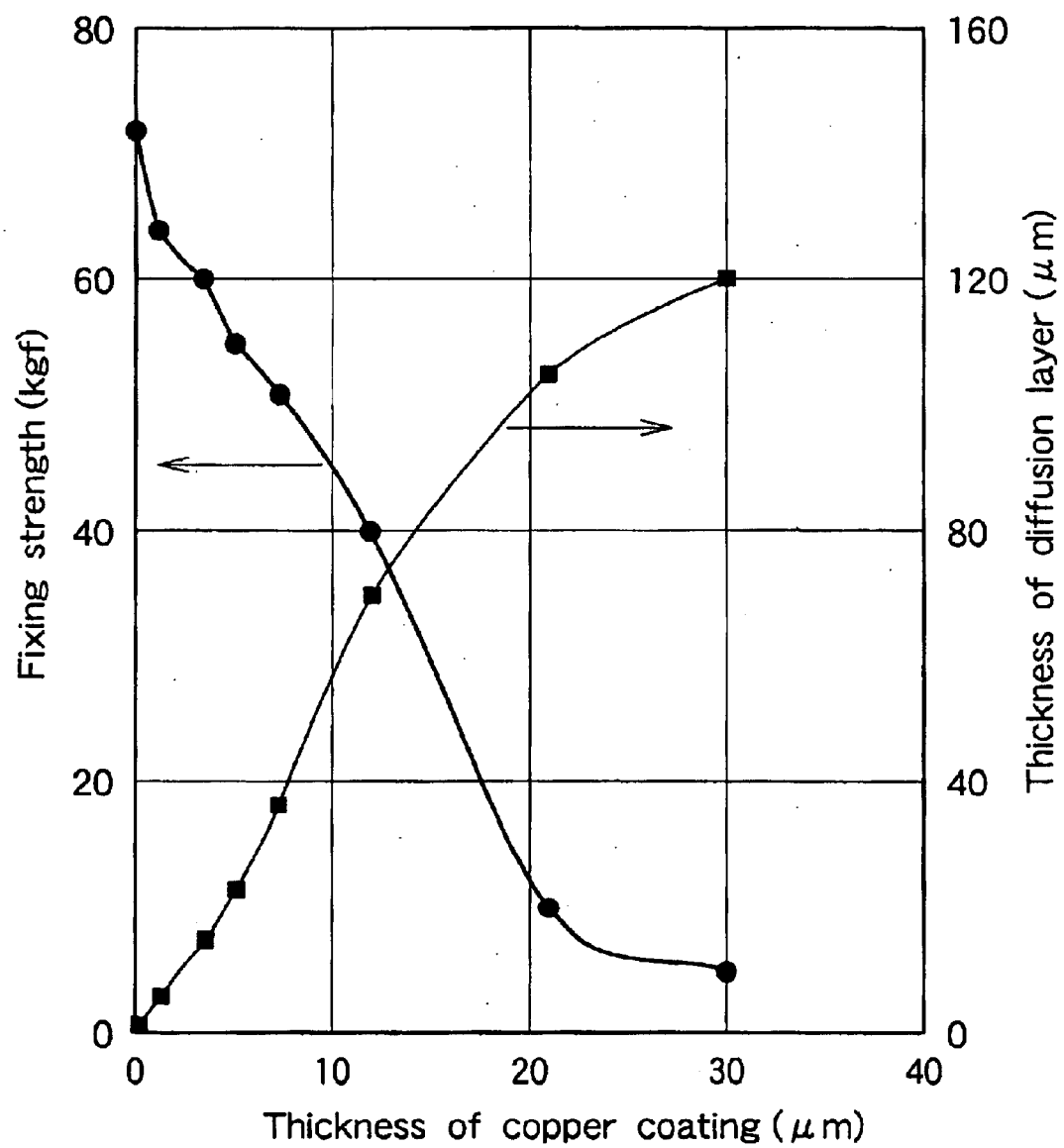
FIG. 15 is a graph showing interrelationships among thickness of Cu coating, pipe fixing strength and thickness of diffusion layer formed as a result of solid-phase joining.
Figure 16:
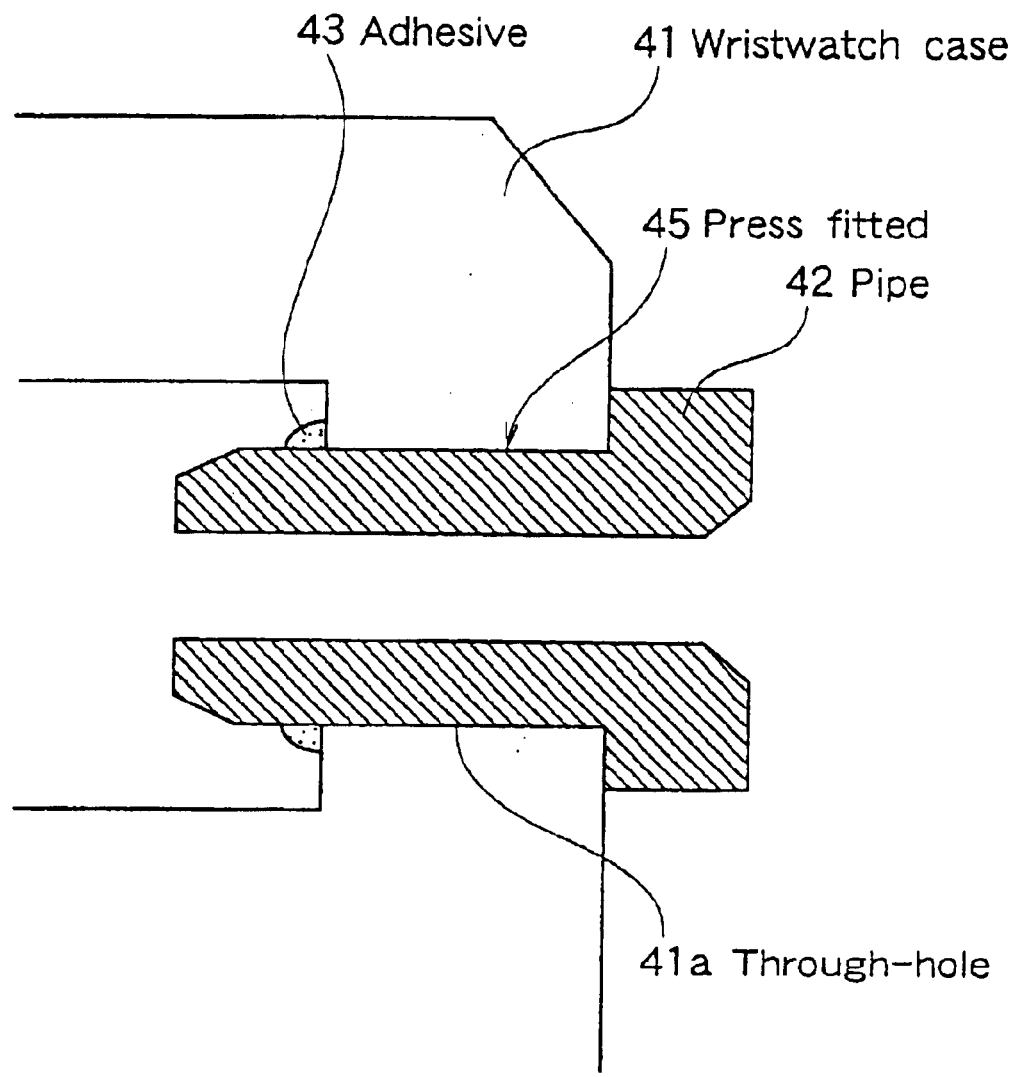
FIG. 16 is a sectional view of wristwatch case according to the related art.

In the working mode B2 according to the second aspect of the present invention, the influence of variation of the thickness of copper plating layer as the metallic coating on the pipe fixing strength and the thickness of diffusion layer formed at the junction interface was studied. The data are shown in FIG. 15.

The thinner the copper coating, the greater the exhibited pipe fixing strength. This would correlate with the strength of intermetallic compound of Ti and Cu formed at the interface. Stepwise formation of a plurality of layers in the interfacial diffusion layer was ascertained as a result of observation through a scanning electron microscope. Accordingly, a decrease of fixing strength would be caused by formation of a layer of low strength in samples furnished with a Cu coating of relatively large thickness. Even at this level of strength nevertheless, the pipe fixing strength satisfactorily exhibits a specification value of 10 kgf or more. However, when the thickness of metallic coating was 20 $\mu$m or greater, the constitution of junction interface became highly complex, and the tendency toward formation of brittle intermetallic compounds and toward lowering of pipe fixing strength was exhibited. On the other hand, when the thickness of metallic coating was less than 0.1 $\mu$m, there was the danger such that the degree of plastic deformation of metallic coating at the time of press fitting was so low as to cause waterproof failure. For these reasons, and taking the reliability into account, it was ascertained that it would be desirable for the thickness of metallic coating provided on the pipe to fall within the range of 0.1 to 20 $\mu$m.

Moreover, the thickness of diffusion layer formed at the interface was 1 m when the thickness of original metallic coating was 0.1 $\mu$m and 100 $\mu$m when the thickness of original metallic coating was 20 $\mu$m. Therefore, it was ascertained that it would be desirable for the thickness of diffusion layer to fall within the range of 1 to 100 $\mu$m.

EXAMPLE

Example A1

Each wristwatch case of titanium was provided with a through-hole by drilling. The through-hole after drilling was reamed for deburring. Separately, a pipe of titanium alloy Ti-6Al-4V having an outside diameter of 0.02 to 0 mm smaller than the diameter of through-hole, namely, a press-fit overlap width of –0.02 to 0 mm was produced by cutting. Further, a pipe of titanium alloy Ti-6Al-4V having an outside diameter of 0 to 0.055 mm larger than the diameter of through-hole, namely, a press-fit overlap width of 0 to 0.055 mm was produced by cutting. Thereafter, a final wristwatch case was produced only by press fitting each of the pipes in the through-hole, and another final wristwatch case was produced by sequentially carrying out the press fitting and a heat treatment in a vacuum atmosphere of $6 \times 10^{-6}$ torr at 700° C. for 30 min whereby a solid-phase joining was effected.

(Evaluation A1)

The waterproof test of wristwatch cases produced in the above Example A1 was carried out. The waterproof test was performed in the following manner. The back lid of each of the wristwatch cases was detached, and the wristwatch case in open form was placed on a hot plate. The moisture of the inside of the wristwatch case was completely removed. Immediately thereafter, the back lid was again assembled in the wristwatch case, and the resultant wristwatch case was immersed in a water of 10 atm for a given period of time. The wristwatch case was taken out, and the surface water was completely wiped off. Again, the wristwatch case was placed undisturbed on a hot plate for quite some time. Cold water was applied to the glass surface of the wristwatch case to thereby rapidly cool the same. In the event of presence of moisture inside the wristwatch case, the moisture condensed on the glass surface, and the glass surface is fogged. The wristwatch case whose glass surface is fogged is evaluated as failure in the waterproof test, and the wristwatch case not exhibiting any fogging is evaluated as success in the waterproof test.

Figure 2:
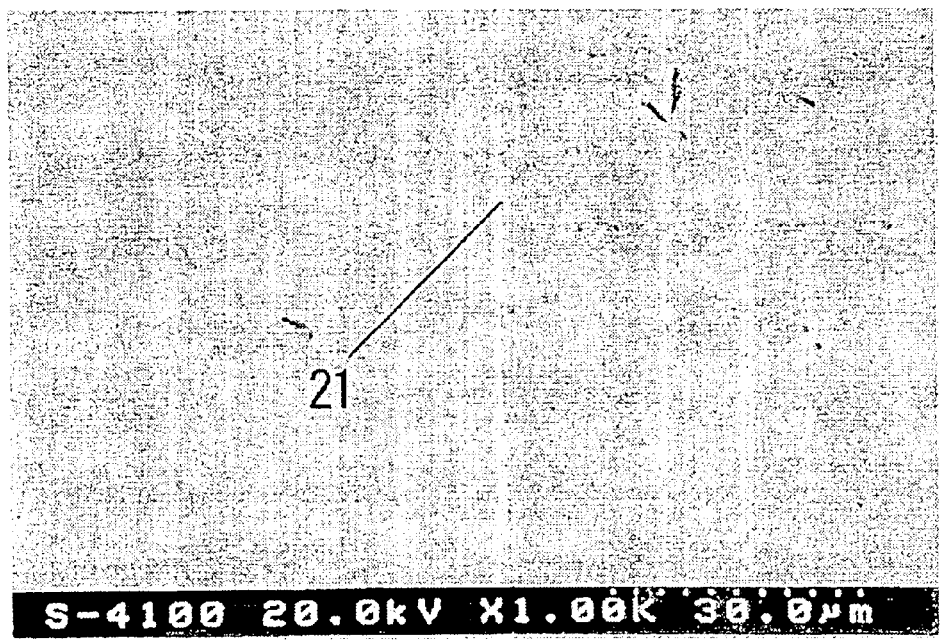
FIG. 2 is a photograph of SEM image of a longitudinal section of pipe press-fitted portion of wristwatch case having only been subjected to press fitting (press-fit overlap width: 0.03 mm).
Figure 8:
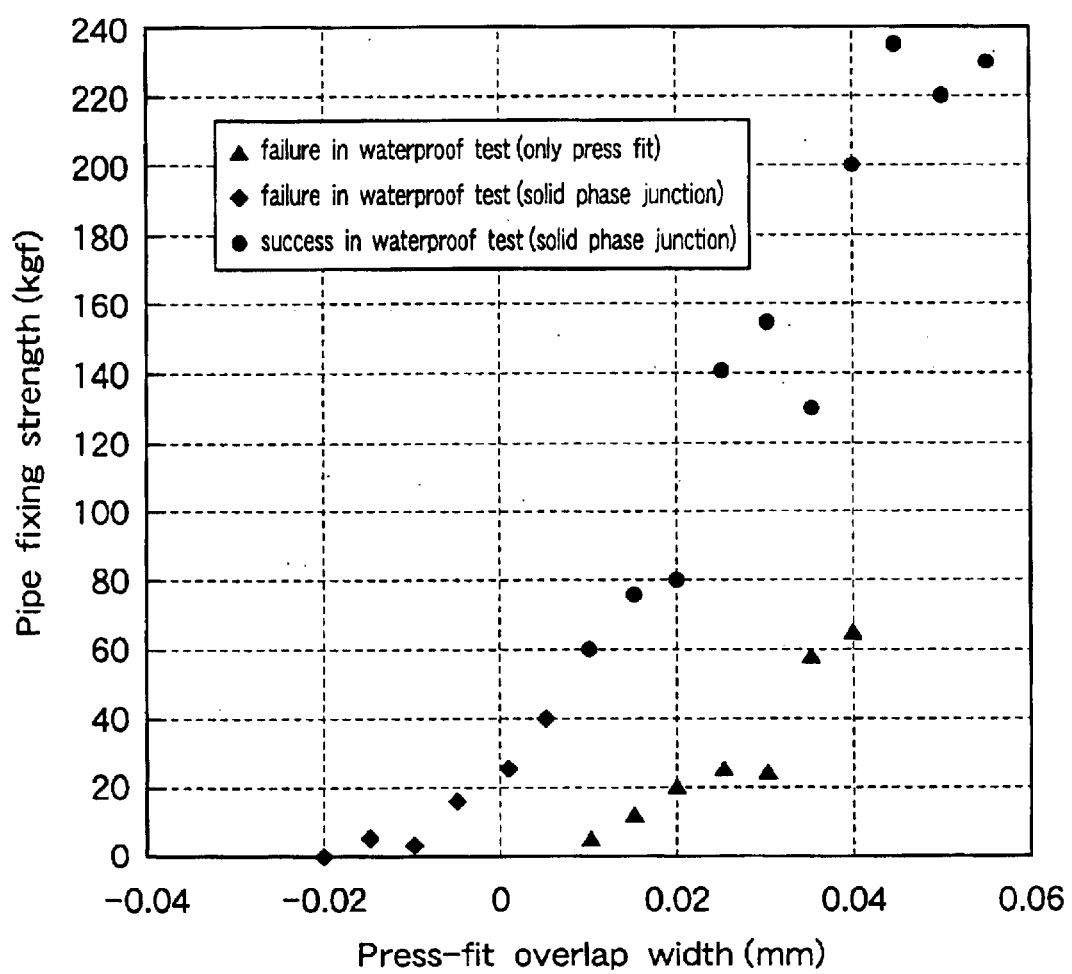
FIG. 8 is a graph showing interrelationships among the press-fit overlap width, pipe fixing strength and waterproof sealing capability with respect to wristwatch cases produced according to the first aspect of the present invention.

With respect to waterproof test results, referring to FIG. 8, all the wristwatch cases only through the press fitting were evaluated as failure, irrespective of the press-fit overlap width. FIG. 2 shows a scanning electron micrograph of a longitudinal section of pipe press-fitted portion of a wristwatch case having only been subjected to the press fitting (press-fit overlap width: 0.03 mm). When only the press fitting has been effected, the appearance shows a unification, but, as apparent from the sectional micrograph of FIG. 2, interface 21 exists between the through-hole and the pipe. It is presumed that water penetration would be caused by the interface 21.

On the other hand, referring to FIG. 8, wristwatch cases through the solid-phase joining, when the press-fit overlap width was smaller than 0.01 mm, were evaluated as failure in the waterproof test. When the press-fit overlap width was 0.01 mm or greater, success was obtained in the waterproof test. The reason would be that the pipe is deformed at the time of press fitting because the inside of the pipe is vacant, so that a stress occurs between the through-hole and the pipe to thereby enable contact of the entire circumference of the pipe with the through-hole with the result that solid-phase joining is attained so as to ensure waterproof capability.

Figure 3:
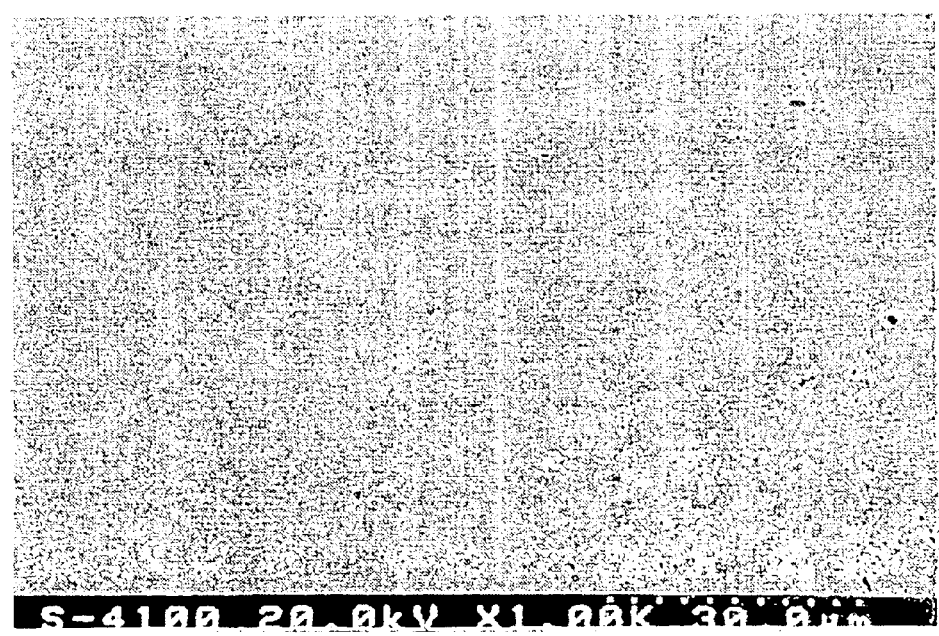
FIG. 3 is a photograph of SEM image of a longitudinal section of pipe press-fitted portion of wristwatch case (press-fit overlap width: 0.01 mm) representing one working mode of the first aspect of the present invention.

FIG. 3 is a scanning electron micrograph of a longitudinal section of pipe press-fitted portion of a wristwatch case having been subjected to solid-phase joining (press-fit overlap width: 0.01 mm). It is apparent therefrom that the interface between the through-hole and the pipe disappeared to thereby attest to joining and unification. It is presumed that, at that time, the aforementioned oxide film (oxygen) lying in the interface would be solid dissolved in the wristwatch case and the pipe to thereby accomplish desirable joining. Therefore, it has been recognized that, when the press-fit overlap width is 0.01 mm or more, excellent waterproof sealing capability can be ensured without occurrence of waterproof failures. With respect to wristwatch cases of 0.055 mm or more press-fit overlap width, the press-fit overlap width was so large that not only the deformation of the pipe but also the influence of dimensional change of pipe inside diameter was unfavorably large. Thus, it has been ascertained that it is desirable to limit the press-fit overlap width within 0.05 mm.

In the present waterproof test, no adhesive commonly employed for reinforcement was used. It has become apparent that the wristwatch cases having been subjected to solid-phase joining can ensure waterproofing capability without the need to employ such an adhesive.

(Evaluation A2)

The pipe fixing strength of each of the wristwatch cases produced in the above Example A1 was measured. In the measurement, each wristwatch case having a through-hole press fitted with a pipe was secured by means of a jig, and a load was applied to the pipe. The pipe fixing strength was evaluated from the value of load at which the pipe was detached from the wristwatch case.

With respect to the wristwatch cases only through the press fitting, referring to FIG. 8, it has been found that, the greater the press-fit overlap width, the greater the pipe fixing strength.

On the other hand, referring also to FIG. 8, the wristwatch case having been subjected to solid-phase joining exhibits a pipe fixing strength strikingly increased over that of the wristwatch case only through the press fitting at the same press-fit overlap width. Therefore, it has become apparent that the pipe fixing strength is strikingly increased by the solid-phase joining. The present measurement of pipe fixing strength was performed without application of any adhesive commonly employed for reinforcement. However, since the pipe fixing strength of conventional wristwatch cases having the through-hole fitted with the pipe, followed by application of an adhesive, was in the range of 20 to 80 kgf, it has been found that the wristwatch case having been subjected to the solid-phase joining can exhibit a pipe fixing strength which is higher than those of conventional wristwatch cases. Further, the wristwatch case having been subjected to the solid-phase joining also gave excellent results in corrosion resistance tests conducted by artificial sweat and saline solution spraying.

Figure 4:
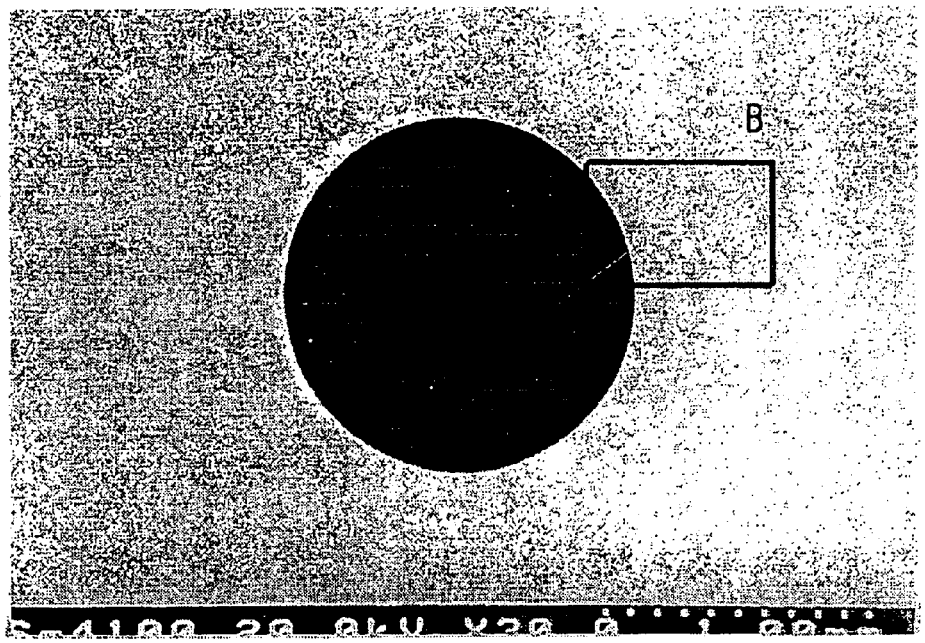
FIG. 4 is a photograph of SEM image of a cross section of pipe press-fitted portion of wristwatch case (press-fit overlap width: 0.001 mm) representing one working mode of the first aspect of the present invention.
Figure 5:
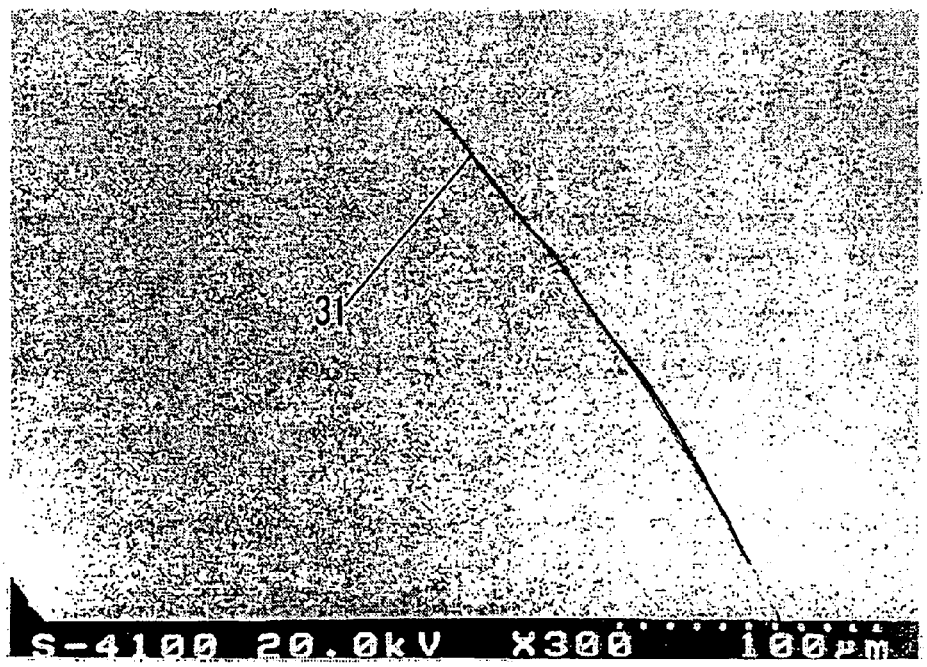
FIG. 5 is a photograph of SEM image of an enlarged section of portion B indicated in FIG. 4.
Figure 6:
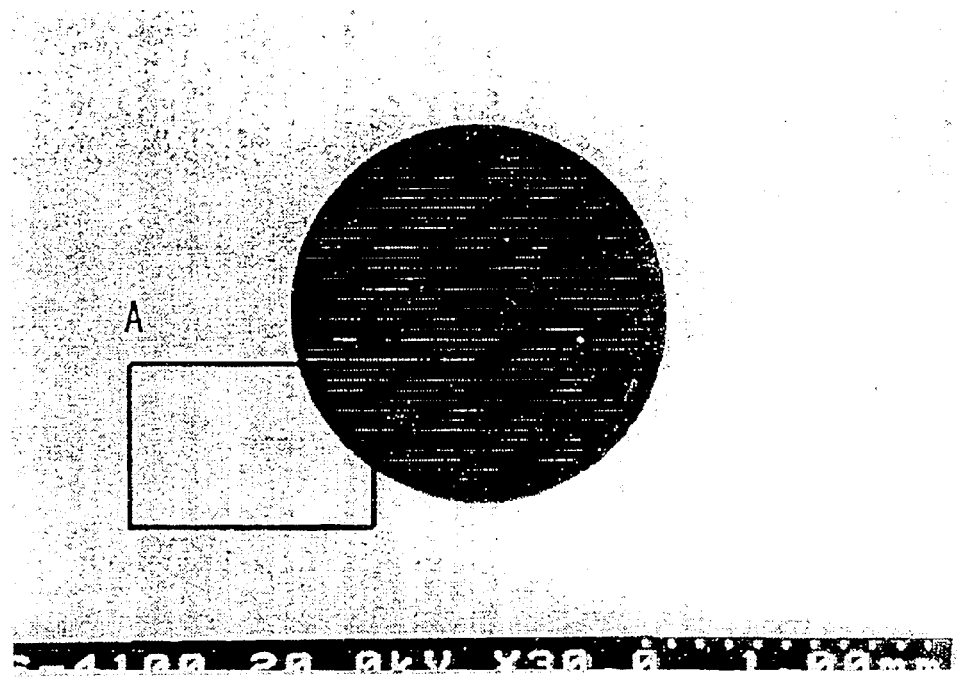
FIG. 6 is a photograph of SEM image of a cross section of pipe press-fitted portion of wristwatch case (press-fit overlap width: 0.03 mm) representing one working mode of the first aspect of the present invention.
Figure 7:
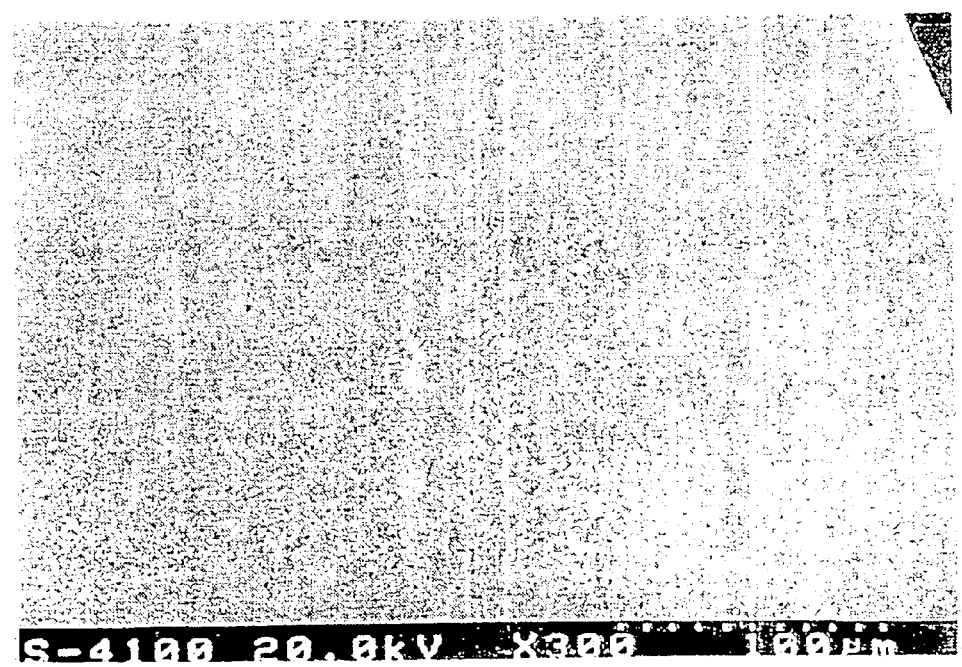
FIG. 7 is a photograph of SEM image of an enlarged section of portion A indicated in FIG. 6.

The reason for a low pipe fixing strength of wristwatch case exhibited even if the solid-phase joining is effected when the press-fit overlap width is less than 0.01 mm would be that, because of a dispersion in the dimensional precision of through-hole and pipe workings, an interface would exist between the through-hole and the pipe so as to fail to accomplish contact of the entire circumference of the pipe with the through-hole. FIG. 4 is a scanning electron micrograph of a cross section of pipe press-fitted portion of a wristwatch case having been subjected to the solid-phase joining (press-fit overlap width: 0.001 mm). FIG. 5 is an enlarged micrograph of portion B indicated in FIG. 4. This figure demonstrated the presence of interface 31 between the through-hole and the pipe occurring when the press-fit overlap width was less than 0.01 mm. With respect to wristwatch cases of 0.01 mm or more press-fit overlap width, it is presumed that the pipe fixing strength would be increased because no interface exists between the through-hole and the pipe so as to accomplish contact of the entire circumference of the pipe with the through-hole. FIG. 6 is a scanning electron micrograph of a cross section of pipe press-fitted portion of a wristwatch case having been subjected to the solid-phase joining (press-fit overlap width: 0.03 mm). FIG. 7 is an enlarged micrograph of portion A indicated in FIG. 6. These have demonstrated that, when the press-fit overlap width falls within the appropriate range, an interface disappearance would occur between the through-hole and the pipe. It is presumed that the aforementioned oxide film (oxygen) lying in the interface would be solid dissolved in the wristwatch case and the pipe to thereby accomplish desirable joining.

In summing up, with respect to the press-fit overlap width, it has been ascertained that, when it is less than 0.01 mm, an interface would exist between the through-hole and the pipe upon press fitting, so that both waterproof capability and pipe fixing strength would not be satisfactory. At the press-fit overlap width of 0.055 mm or more, it has been ascertained that the deformation of the pipe and thus the influence of dimensional change of pipe inside diameter would be unfavorably large. Therefore, it has been ascertained that it is preferred to cause the press-fit overlap width to range from 0.01 mm to 0.05 mm, especially, taking into account the dispersion of through-hole and pipe dimensions and easiness in press fitting at mass production, from 0.015 mm to 0.03 mm.

Example A2

Each wristwatch case of titanium after specular polishing was provided with a through-hole by drilling. The through-hole after drilling was reamed for deburring. Separately, a pipe of titanium alloy Ti-6Al-4V having an outside diameter of 0.025 mm larger than the diameter of through-hole, namely, a press-fit overlap width of 0.025 mm was produced by cutting. Thereafter, a final wristwatch case was produced by press fitting the pipe in the through-hole and effecting a heat treatment in a vacuum oven atmosphere of $6 \times 10^{-6}$ torr at temperatures varied from 500 to 900° C. for a fixed period of 30 min whereby a solid-phase joining was effected.

(Evaluation A3)

Figure 9:
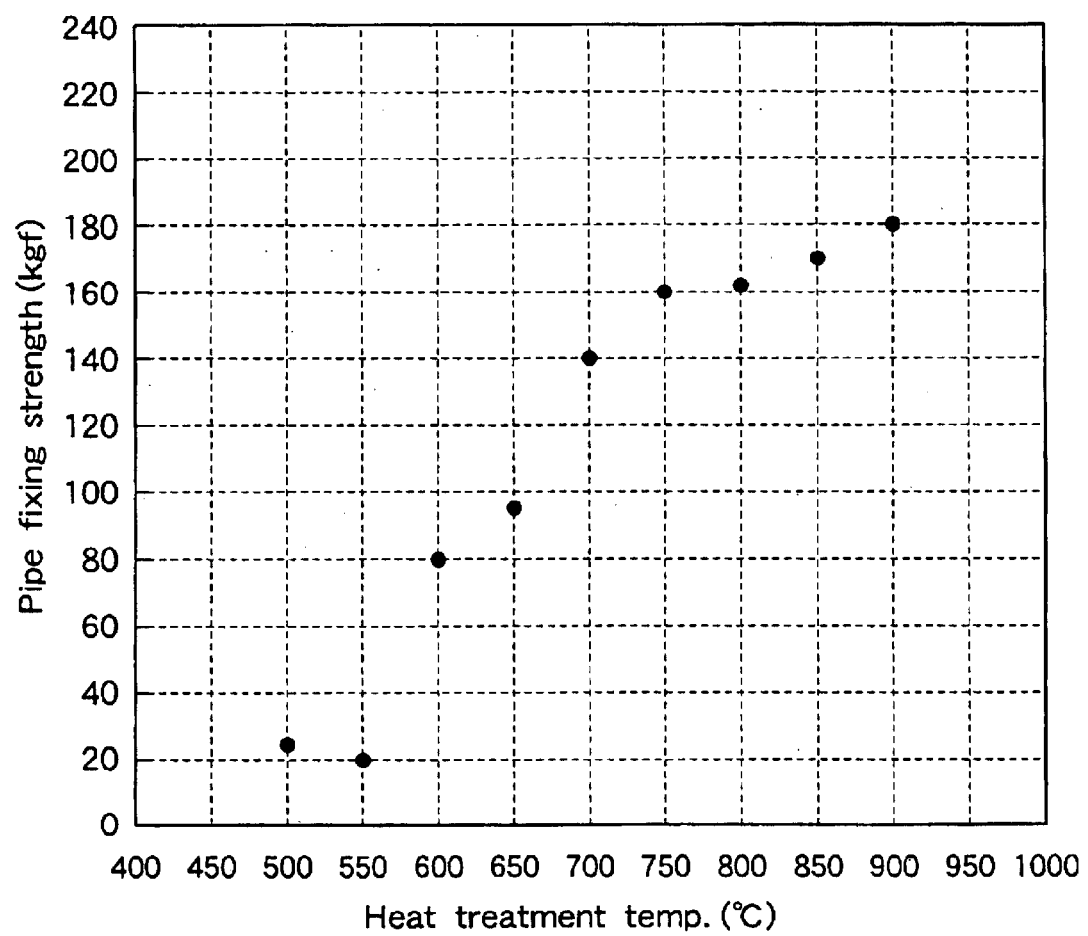
FIG. 9 is a graph showing the interrelationship between heat treatment temperature and pipe fixing strength with respect to wristwatch cases produced according to the first aspect of the present invention

The pipe fixing strength of wristwatch cases prepared in the above Example A2 was measured, thereby obtaining results of FIG. 9. Further, the surface condition of the wristwatch cases was inspected.

Referring to FIG. 9, any high pipe fixing strength was not obtained at 550° C. or below. It is apparent that the pipe fixing strength is strikingly increased by performing the solid-phase joining at 600° C. or higher heat treatment temperatures. When the solid-phase joining was effected at 900° C. heat treatment temperature, the wristwatch case after specular polishing fogged although the pipe fixing strength was high. The reason would be that the crystal structure of titanium has become coarse as a result of heat treatment performed at temperature higher than the transformation point of titanium, 882° C. Although the structure having become coarse can be removed by re-polishing, it would cause the operations to become complex and would bring about other disadvantages. Therefore, it has been considered that, for obtaining a high pipe fixing strength and for avoiding the alteration of surface condition by heat treatment, it is preferred to perform the heat treatment at 600 to 850° C., especially, taking the temperature distribution of oven at mass production, etc. into account, 700 to 800° C.

Example A3

Each wristwatch case of titanium after specular polishing was provided with a through-hole by drilling. The through-hole after drilling was reamed for deburring. Separately, a pipe of titanium alloy Ti-6Al-4V having an outside diameter of 0.025 mm larger than the diameter of through-hole, namely, a press-fit overlap width of 0.025 mm was produced by cutting. Thereafter, a final wristwatch case was produced by press fitting the pipe in the through-hole and effecting a heat treatment in a vacuum oven atmosphere of $6 \times 10^{-6}$ torr at a fixed temperature of 700° C. for a period varied among 1 min, 5 min, 30 min, 60 min, 90 min, 120 min, 150 min and 180 min, whereby a solid-phase joining was effected.

(Evaluation A4)

Figure 10:
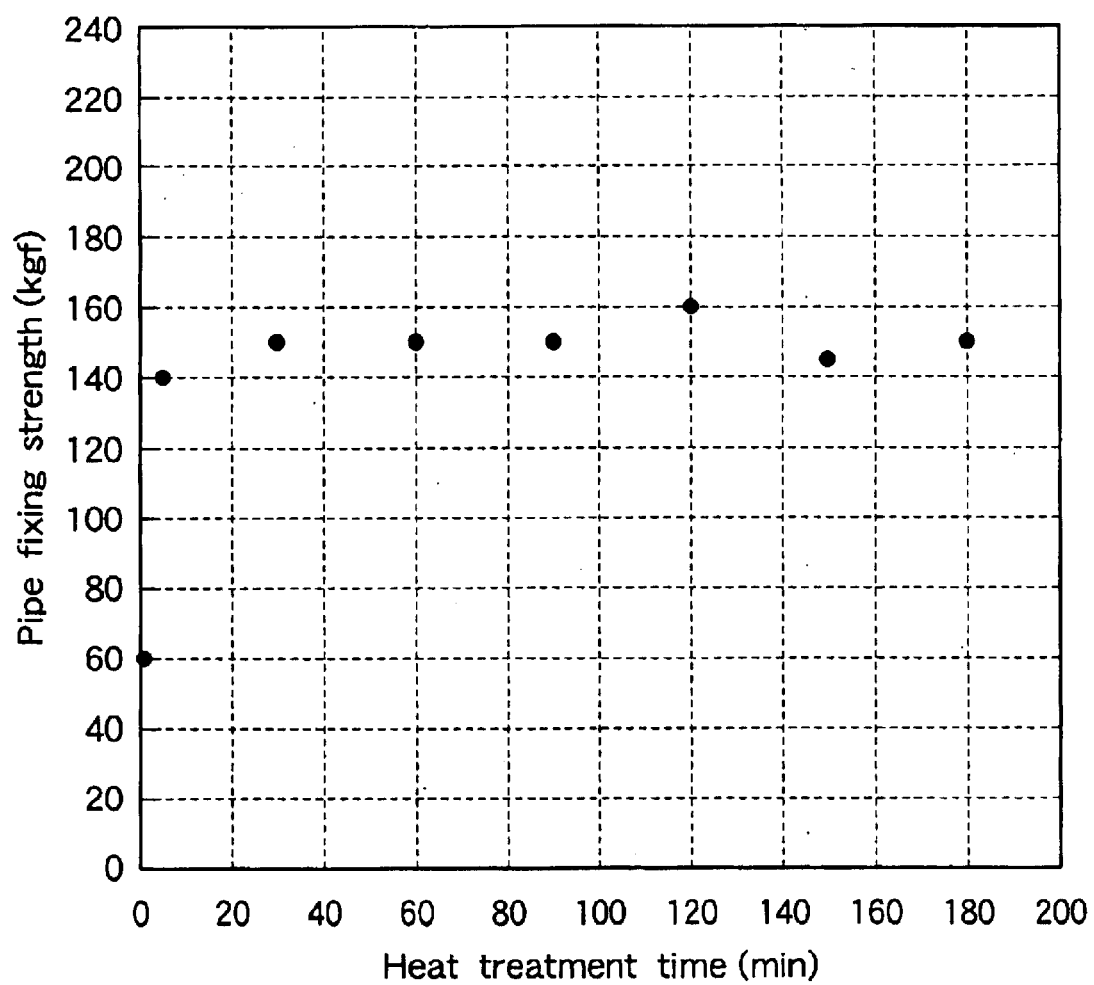
FIG. 10 is a graph showing the interrelationship between heat treatment time and pipe fixing strength with respect to wristwatch cases produced according to the first aspect of the present invention.

The pipe fixing strength of wristwatch cases prepared in the above Example A3 was measured, thereby obtaining results of FIG. 10. Further, the surface condition of the wristwatch cases was inspected.

Referring to FIG. 10, although the pipe fixing strength was low when the heat treatment time was 1 min as compared with those exhibited when other heat treatment times were employed, desirable pipe fixing strengths were obtained when the other heat treatment times were employed. Further, the surface condition of the wristwatch cases remained unchanged without exception despite the heat treatment. Although therefore a desirable wristwatch case can be obtained by performing the heat treatment for 5 min or more, it would be preferable to carry out the heat treatment for a period of 30 min to 1 hr from the viewpoint of the temperature stability of vacuum oven after temperature rise, mass productivity, etc.

Example A4

Each wristwatch case of titanium was provided with a through-hole by drilling. The through-hole after drilling was reamed for deburring. Subsequently, wristwatch cases whose through-hole roundness and maximum surface roughness Rmax were in the range of 0.005 to 0.02 mm and 0.003 to 0.01 mm, respectively were chosen. Separately, pipes of titanium having an outside diameter of 0.025 mm larger than the diameter of through-hole, namely, a press-fit overlap width of 0.025 mm were produced by cutting. Pipes whose roundness and maximum surface roughness Rmax were in the range of 0.005 to 0.02 mm and 0.003 to 0.01 mm, respectively were chosen. Thereafter, final wristwatch cases were produced by press fitting pipes in through-holes and effecting a heat treatment in a vacuum oven atmosphere of $6 \times 10^{-6}$ torr at 700° C. for a period of 30 min whereby a solid-phase joining was effected.

(Evaluation A5)

With respect to the wristwatch cases prepared in the above Example A4, the same tests as in the above Evaluations A1 and A2 were carried out.

As a result, among the wristwatch cases whose through-hole and pipe roundness values and maximum surface roughness Rmax values were greater than 0.01 mm and greater than 0.005 mm, respectively, there were some wherein an interface did not disappear and remained between wristwatch case and pipe despite the solid-phase joining performed and which were evaluated as failure in the waterproof test. Therefore, it has been ascertained that it is preferred that, with respect to both the through-hole diameter and the pipe outside diameter, the roundness be 0.01 mm or less and the maximum surface roughness Rmax be 0.005 mm or less.

In summing up, excellent waterproof capability and high pipe fixing strength were attained by first providing titanium or titanium alloy wristwatch cases and pipes each having a roundness of 0.01 mm or less and a surface roughness of 0.005 mm or less, subsequently press fitting pipes in through-holes so that the press-fit overlap width is in the range of 0.01 to 0.05 mm, preferably 0.015 to 0.03 mm, and thereafter effecting a heat treatment in a vacuum on the order of $10^{-6}$ torr at 600 to 850° C., preferably 700 to 800° C., for a period of 5 min or more, preferably 30 min to 1 hr.

Example A5

Each wristwatch case of SUS 304 after specular polishing was provided with a through-hole by drilling. The through-hole after drilling was reamed for deburring. Separately, a pipe of SUS 316F having an outside diameter of 0.02 mm larger than the diameter of through-hole, namely, a press-fit overlap width of 0.02 mm was produced by cutting. Thereafter, a final wristwatch case was produced by press fitting the pipe in the through-hole and effecting a heat treatment in a vacuum oven atmosphere of $7 \times 10^{-6}$ torr at 800° C. for a period of 30 min.

Example A6

Each wristwatch case of SUS 304 after specular polishing was provided with a through-hole by drilling. The through-hole after drilling was reamed for deburring. Separately, a pipe of SUS 316F having an outside diameter of 0.02 mm larger than the diameter of through-hole, namely, a press-fit overlap width of 0.02 mm was produced by cutting. Thereafter, a final wristwatch case was produced by press fitting the pipe in the through-hole and effecting a heat treatment in a reducing atmosphere oven at 750° C. for a period of 1 hr.

(Evaluation A6)

With respect to the wristwatch cases prepared in the above Examples A5 and A6, the same tests as in the above Evaluations A1 and A2 were carried out.

As a result, in the use of stainless steel as well, the surface condition was maintained and the pipe fixing strength and waterproof sealing capability were excellent when the same press-fit overlap width, roundness and surface roughness as those of titanium and titanium alloy were exhibited and when the heat treatment temperature was in the range of 600 to 900° C. Further, excellent results were also obtained in the corrosion resistance tests conducted by not only the artificial sweat but also the spraying a saline solution.

Although in the above examples each pipe was press fitted in the through-hole of wristwatch case and heated in vacuum to thereby effect the solid-phase joining, this process can be replaced by one comprising furnishing the through-hole with a tapped hole while threading the circumferential portion of pipe, screwing the pipe in the through-hole and heating them in vacuum to thereby effect the solid-phase joining. Also, the process may comprise threading the circumferential portion of pipe, bringing the thread on the circumferential portion of pipe into contact with the internal surface of nontapped through-hole and heating them in vacuum to thereby effect the solid-phase joining. Further, the process may comprise furnishing the through-hole with a tapped hole, bringing the pipe into contact with the tapped hole portion and heating them in vacuum to thereby effect the solid-phase joining.

Moreover, although in the above examples each pipe was press fitted in the through-hole of wristwatch case, pressure bonding by swaging is also applicable. In this method, even when the press-fit overlap width is close to 0 mm, minute gaps can be eliminated by, after the pipe press fitting, pressing a rigid ball having a diameter slightly larger the inside diameter of through-hole minus pipe thickness into the internal hollow of the pipe so that the pipe can be expanded outward and deformed. The solid-phase joining can be accomplished by effecting a heat treatment in vacuum in the above state.

Example B1

Although in the aforementioned working modes B1 and B2 the heat treatment was effected at 800° C. for titanium, the heat treatment was instead performed at less than 600° C. (570° C.). Joining did not proceed at desirable rate, and quite a long time (24 hr) was required. Further, there was such a danger that the solid-phase diffusion reaction would not satisfactorily proceed to thereby cause waterproof failure.

On the other hand, heating at temperature higher than 850° C. (900° C.) posed such a problem that partial transformation would occur to thereby cause surface roughening.

Example B2

Although in the aforementioned working modes B1 and B2 samples of 0.01 mm or less roundness and 5 $\mu$m or less surface maximum roughness (Rmax) were chosen and used, use was made of those of more than 0.01 mm roundness or more than 5 $\mu$m maximum roughness. There was such a tendency that gaps formed at the interface by the press fitting would not completely be filled by the plastic deformation of plating layer at the time of press fitting and by the joining through heat treatment in vacuum, thereby causing deterioration of waterproof sealing capability. Therefore, it has been ascertained that, with respect to the through-hole of wristwatch case and the circumferential portion of pipe press fitted therein, the roundness is preferably 0.01 mm or less while the surface roughness is preferably 5 $\mu$m or less.

As indicated in the above Evaluation B2, when the press-fit overlap width was less than 0 mm, there was a tendency for minute gaps to occur at the interface at the time of press fitting, thereby deteriorating waterproof sealing capability. On the other hand, when the press-fit overlap width exceeded 0.05 mm, the press fitting was difficult. In unfavorable occasions, the pipe was deformed. The larger the press-fit overlap width, the larger the change of pipe inside diameter. In this respect as well, dimensional control becomes difficult. Therefore, it has been ascertained that it is preferred to set the press-fit overlap width so as to fall within the range of 0 to 0.05 mm. Further, it has been ascertained that, from the viewpoint of dimensional accuracy and control at mass production, etc., it is still preferred to set the press-fit overlap width so as to fall within the range of 0.01 to 0.03 mm.

Example B3

The wristwatch case of the present invention may be constituted of stainless steel. In this Example B3, there will be described a working example wherein SUS 304 is used in the wristwatch case while free-cutting stainless steel SUS 316F is used in the pipe.

First, the stainless steel case at a desired position was provided with a through-hole. A pipe furnished with a metallic coating, Pt coating in this example, with a thickness of 2 $\mu$m was press fitted in the case through-hole. The wristwatch case press fitted with the pipe was passed through an in-line hydrogen flow atmosphere oven at 750° C. for 10 min. During this heating, a counter diffusion of Fe, Cr contained in stainless steel and Pt occurred to thereby form at the interface a diffusion layer with which joining was accomplished. It was ascertained that, thus, pipe fixing strength and waterproof sealing capability were excellent.

It is preferred that the heating for accomplishing the joining and fixing of the stainless steel pipe to the stainless steel case be performed at 600 to 900° C.

When the heating temperature is below 600° C., the solid phase diffusion may not satisfactorily proceed to thereby cause unsatisfactory pipe fixing strength and waterproof sealing capability. On the other hand, when the heating temperature exceeds 900° C., the wristwatch case after specular polishing may fog. Although this preferred heating temperature range of 600 to 900° C. includes a temperature zone overlapping with the aforementioned sensitization temperature of stainless steel, it has been found that, in the present invention, when the heating time is 1 hr or less, sensitization would not occur and, in particular, such a phenomenon that corrosion resistance is deteriorated would not occur. It is presumed that the reason would be an extremely short heating time. When the heating is performed for a prolonged period of time, however, the above would not apply. Therefore, it has been recognized that, at the above heating temperature, the preferred heating time is in the range of 10 min to 1 hr.

With respect to the wristwatch case produced, namely, wristwatch case produced through joining of a pipe to a case and formation of a diffusion layer at the interface, according to the constitution and pipe fixing method of the second aspect of the present invention, corrosion resistance tests such as an artificial sweat test and CASS test were carried out. In all the tests, excellent results were obtained. Thus, it has been ascertained that there is no problem with respect to the corrosion resistance thereof.

Other Working Modes

Although the pipe fixing method comprising press fitting a pipe in a through-hole provided in a case and heating in vacuum was described in the above working modes and Examples according to the second aspect of the present invention, it is feasible to employ the following method instead. In the alternative method, the through-hole is provided with a female tapped hole, while the circumferential portion of the pipe is provided with a male tapped hole capable of engaging with the female tapped hole. A metallic coating is formed on the outer surface of the pipe, and the pipe is screwed (turned) so as to effect engagement. Thereafter, heating is performed in vacuum to thereby accomplish joining of the pipe to the case.

Moreover, in another working example, in place of the pipe press fitting for joining under pressure the titanium and the metallic coating to each other, pressure bonding by swaging is also applicable. In this method, even when the press-fit overlap width is less than 0, minute gaps can be eliminated by, after the pipe press fitting, pressing a rigid ball having a diameter slightly larger the inside diameter of through-hole minus pipe thickness into the internal hollow of the pipe so that the pipe can be expanded outward and deformed. The solid-phase joining, namely, pipe fixing can be accomplished by effecting a heat treatment in vacuum in the above state.

With respect to the wall thickness of stem pipe, as long as it is approximately 0.1 mm or more, a satisfactory stress would occur at the interface even after press fitting deformation to thereby ensure the solid-phase joining.

In the first aspect of the present invention, a wristwatch case having a pipe solid-phase joined thereto with no junction interface therebetween can be obtained, without deterioration of the surface condition of wristwatch case as a result of the joining, by sequentially carrying out press fitting of a pipe in a through-hole provided in a wristwatch case and heat treatment in vacuum or a reducing atmosphere. Consequently, not only high waterproof reliability but also excellent corrosion resistance and satisfactory joining strength, namely, pipe fixing strength can be obtained. Further, adhesives conventionally employed for reinforcement can be unnecessitated.

In the second aspect of the present invention, a wristwatch case and a pipe are joined and fixed to each other through a specified diffusion layer. Therefore, a wristwatch case which not only has excellent waterproof capability and corrosion resistance but also is ensured for long-term reliability of pipe fixing can be obtained. Further, because of a simple constitution, the invention is advantageous in yield and cost. Still further, pipe fixing can be accomplished without adverse influence on the surface configuration of titanium and stainless steel.

Moreover, the applicability of the method of fixing a pipe to a wristwatch case according to the present invention is not limited to the fixing of a pipe for wristwatch stem to a case through-hole, and the method is applicable to constitution of, for example, coupling parts of a push button, a sensor for diver watch, etc.

What is claimed is:

1. A wristwatch case having a wristwatch case body provided with a through-hale arid a pipe press-fitted in the through-hole, wherein said pipe is joined and fixed to the wristwatch body so as to have no junction interface between the pipe and the wristwatch body, wherein said wristwatch case and said pipe are joined and fixed to each other through a diffusion layer, and wherein the wristwatch case comprises a material selected from among pure titanium, titanium alloys and stainless steel, the pipe comprises a material selected from among pure titanium, titanium alloys and stainless steel, and the diffusion layer comprises a layer formed by a solid phase diffusion, said diffusion layer containing at least two metals selected from among Ti, Fe, Cr, Ni, Cu, Al, Pt, Au, Pd and Ag.

2. The wristwatch case as claimed in claim 1, wherein the diffusion layer has a thickness of 1 to 100 μm.

3. A wristwatch case having a wristwatch case body provided with a through-hole and a pipe press-fitted in the through-hole, wherein said pipe is joined and fixed to the wristwatch body so as to have no junction interface between the pipe and the wristwatch body, wherein said wristwatch case and said pipe are joined and fixed to each other through a diffusion layer, and wherein the wristwatch case comprises a material selected from among pure titanium and titanium alloys, the pipe comprises a material selected from among pure titanium and titanium alloys, and the diffusion layer comprises a layer formed by a solid phase diffusion, said diffusion layer containing at least two metals selected from among Ti, Fe, Cr, Ni, Cu, Al, Pt, Au, Pd and Ag.

4. The wristwatch case as claimed in claim 3, wherein the diffusion layer has a thickness of 1 to 100 μm.

5. A wristwatch case having a wristwatch case body provided with a through-hole and a pipe press-fitted in the through-hole, wherein said pipe is joined and fixed to the wristwatch body so as to have no junction interface between the pipe and the wristwatch body, wherein said wristwatch case and said pipe are joined and fixed to each other through a diffusion layer, and wherein both the wristwatch case and the pipe comprise stainless steel, and the diffusion layer comprises a layer formed by a solid phase diffusion, said diffusion layer containing at least two metals selected from among Ti, Fe, Cr, Ni, Cu, Al, Pt, Au, Pd and Ag.

6. The wristwatch case as claimed in claim 5, wherein the diffusion layer has a thickness of 1 to 100 μm.

7. A wristwatch vase having a wristwatch case body provided with a through-hole and a pipe press-fitted in the through-hole which is obtainable by a process comprising:

providing a wristwatch case body with a through-hole;

press fitting a pipe exhibiting a through-hole/pipe press-fit overlap width of greater than 0 mm in the through-hole; and heating the wristwatch case after the press fitting, thereby joining and fixing the pipe to the wristwatch body so as to have no junction interface between the pipe and the wristwatch body, wherein the diameter of the through-hole and the outside diameter of the pipe each exhibit a roundness of 0.01 mm or less.

8. A wristwatch case having a wristwatch case body provided with a through-hole and a pipe press-fitted in the through-hole which is obtainable by a process comprising:

providing a wristwatch case body with a through-hole;

press fitting a pipe exhibiting a through-hole/pipe press-fit overlap width of greater than 0 mm in the through-hole; and heating the wristwatch case after the press fitting, thereby joining and fixing the pipe to the wristwatch body so as to have no junction interface between the pipe and the wristwatch body, wherein the through-hole on its internal surface has a surface roughness maximum (Rmax1) of 5 μm or less, and/or the pipe on its outside diameter portion has a surface roughness maximum (Rmax2) of 5 μm or less.

9. A wristwatch case having a wristwatch case body provided with a through-hole and a pipe press-fitted in the through-hole, which is obtainable by a process comprising:

providing a wristwatch case body with a through-hole;

press fitting a pipe which has it surface finished with a metallic coating and exhibits a through-hole/pipe press-fit overlap width of greater than 0 mm in the through-hole; and heating the wristwatch case after the press fitting in a vacuum or a reducing gas;

thereby joining and fixing said pipe to the wristwatch body through a diffusion layer, wherein the diameter of the through-hole and the outside diameter of the pipe each exhibit a roundness of 0.01 mm or less.

10. A wristwatch case having a wristwatch case body provided with a through-hole and a pipe press-fitted in the through-hole, which is obtainable by a process comprising:

providing a wristwatch case body with a through-hole;

press fitting a pipe which has its surface finished with a metallic coating and exhibits a through-hole/pipe press-fit overlap width of greater than 0 mm, in the through-hole; and heating the wristwatch case after the press fitting in a vacuum or a reducing gas;

thereby joining and fixing said pipe to the wristwatch body through a diffusion layer, wherein the through-hole on its internal surface has a surface roughness maximum (Rmax3) of 5 μm or less, and/or the pipe on its outside diameter portion has a surface roughness maximum (Rmax4) of 5 μm or less.

11. A wristwatch case having a wristwatch case body provided with a through-hole and a pipe press-fitted in the through-hole, which is obtainable by a process comprising:

providing a wristwatch case body with a through-hole;

press fitting a pipe which has its surface finished with a metallic coating and exhibits a through-hole/pipe press-fit overlap width of greater than 0 mm in the through-hole; and heating the wristwatch case after the press fitting in a vacuum or a reducing gas;

thereby joining and fixing said pipe to the wristwatch body through a diffusion layer, wherein the diffusion layer comprises a layer formed by a solid phase diffusion from the metallic coating comprising at least two metals selected from among Ti, Fe, Cr, Ni, Cu, Al, Pt, Au, Pd and Ag.

12. A process of fixing a pipe to a wristwatch case body, comprising:

providing a wristwatch case body with a through-hole;

press fitting a pipe which has its surface finished with a metallic coating and exhibits a through-hole/pipe press-fit overlap width of greater than 0 mm in the through-hole; and heating the resultant wristwatch case after the press fitting in a vacuum or a reducing gas, thereby joining and fixing the said pipe to the wristwatch body through a diffusion layer, wherein the metallic coating comprises at least two metals selected from among Ti, Fe, Cr, Ni, Cu, Al, Pt, Au, Pd and Ag, and the diffusion layer comprises at least two metals selected from among Ti, Fe, Cr, Ni, Cu, Al, Pt, Au, Pd and Ag.

* * * * *

UNITED STATES PATENT AND TRADEMARK OFFICE
CERTIFICATE OF CORRECTION

PATENT NO. : 6,920,692 B2
DATED : July 26, 2005
INVENTOR(S) : Uchida et al.

It is certified that error appears in the above-identified patent and that said Letters Patent is hereby corrected as shown below:

Column 26,
Line 28, "through-hale arid a" should read -- through-hole and a --.

Column 27,
Line 10, "A wristwatch vase" should read -- A wristwatch case --.

Signed and Sealed this

Seventeenth Day of January, 2006

JON W. DUDAS
*Director of the United States Patent and Trademark Office*